(12) United States Patent
Rowley et al.

(10) Patent No.: US 7,389,975 B2
(45) Date of Patent: Jun. 24, 2008

(54) METHODS AND APPARATUS FOR FENCING AND OTHER STRUCTURES

(75) Inventors: Michael Rowley, Munster, IN (US); David Kurth, Dyer, IN (US)

(73) Assignee: On the Fence Technologies, LLC Corporation, Munster, IN (US)

( * ) Notice: Subject to any disclaimer, the term of this patent is extended or adjusted under 35 U.S.C. 154(b) by 0 days.

(21) Appl. No.: 11/293,454

(22) Filed: Dec. 2, 2005

(65) Prior Publication Data

US 2006/0131552 A1    Jun. 22, 2006

Related U.S. Application Data

(62) Division of application No. 10/347,972, filed on Jan. 21, 2003, now Pat. No. 7,032,891.

(51) Int. Cl.
*E04H 17/00* (2006.01)

(52) U.S. Cl. ............................ 256/24; 256/73
(58) Field of Classification Search ............. 256/24–31, 256/59–64, 73; 49/80.1
See application file for complete search history.

(56) References Cited

U.S. PATENT DOCUMENTS

| | | | |
|---|---|---|---|
| 2,230,707 A * | 2/1941 | Wallace .................... 49/371 |
| 2,236,865 A | 4/1941 | Bailey et al. |
| 2,419,635 A * | 4/1947 | Faulkner .................. 49/371 |
| 2,759,410 A | 8/1956 | Hurt, Jr. |
| 2,789,792 A | 4/1957 | Davis |
| 2,802,645 A | 8/1957 | Rice |
| 3,137,043 A | 6/1964 | Moeller |
| 3,397,866 A | 8/1968 | Hockett |
| 3,556,569 A | 1/1971 | Bruhn |
| 3,770,245 A | 11/1973 | Murdock |
| 3,825,229 A | 7/1974 | Bartlett et al. |
| D233,671 S | 11/1974 | Gay |
| 3,910,561 A | 10/1975 | Fornells |
| 4,014,520 A | 3/1977 | Walters |
| 4,022,435 A | 5/1977 | Glass |
| D245,010 S | 7/1977 | Bajorek et al. |

(Continued)

FOREIGN PATENT DOCUMENTS

GB    2 241 000 A    8/1991

(Continued)

OTHER PUBLICATIONS

U.S. Appl. No. 11/335,098, filed Jan. 18, 2006, Rowley et al.

(Continued)

*Primary Examiner*—Robert J Sandy
*Assistant Examiner*—Ruth C Rodriguez
(74) *Attorney, Agent, or Firm*—Brinks Hofer Gilson & Lione

(57) ABSTRACT

An improved method and apparatus for fencing and other outdoor structures that allow the structure to be changed or adjusted to modify the function, use or appearance of the structure. The structure can be adjusted into a selected position and releasably secured, or portions can be changed to modify the appearance of the structure. One aspect of the invention provides an accessible compartment in the structure to retain objects such as wires or other conduits, and allows for attaching selected objects to the structure.

18 Claims, 16 Drawing Sheets

U.S. PATENT DOCUMENTS

| | | | |
|---|---|---|---|
| 4,049,038 A | 9/1977 | Hyman et al. | |
| 4,073,477 A | 2/1978 | Walters | |
| 4,114,860 A | 9/1978 | Parisien | |
| 4,214,734 A | 7/1980 | Stafford | |
| 4,231,552 A * | 11/1980 | Thomas | 254/24 |
| 4,271,622 A * | 6/1981 | Tippmann et al. | 256/24 |
| 4,369,953 A | 1/1983 | Greiner et al. | |
| 4,383,676 A | 5/1983 | Souza, Jr. | |
| D292,614 S | 11/1987 | Nilsson | |
| 4,706,942 A | 11/1987 | Robbins, Jr. | |
| 4,709,506 A | 12/1987 | Lukaszonas | |
| 4,723,761 A | 2/1988 | Cluff | |
| 4,750,713 A | 6/1988 | Hirose | |
| 4,809,955 A | 3/1989 | Veilleux | |
| 4,883,256 A | 11/1989 | Hebda | |
| 4,886,102 A | 12/1989 | Debs | |
| 4,913,216 A | 4/1990 | Lemay | |
| 4,946,727 A | 8/1990 | Kessler | |
| 4,964,618 A | 10/1990 | Kennedy et al. | |
| 4,968,005 A | 11/1990 | Zen | |
| 5,029,628 A | 7/1991 | Lemay | |
| 5,070,664 A | 12/1991 | Groh et al. | |
| 5,165,664 A | 11/1992 | Cluff | |
| 5,177,890 A * | 1/1993 | Hisatomi et al. | 256/32 |
| 5,181,695 A | 1/1993 | Arthur | |
| 5,216,837 A | 6/1993 | Cleaver et al. | |
| 5,275,380 A | 1/1994 | Barsby | |
| 5,288,048 A | 2/1994 | Shreiner | |
| 5,347,756 A | 9/1994 | Abbott et al. | |
| 5,383,739 A | 1/1995 | Haglund | |
| 5,421,557 A * | 6/1995 | Vise | 256/24 |
| 5,441,239 A * | 8/1995 | Watson | 256/1 |
| 5,443,244 A | 8/1995 | Gibbs | |
| 5,469,658 A | 11/1995 | Digianni et al. | |
| D369,264 S | 4/1996 | Suh | |
| 5,529,288 A | 6/1996 | Cheng-I | |
| 5,613,664 A | 3/1997 | Svalbe | |
| 5,649,689 A | 7/1997 | Wilson | |
| 5,695,174 A | 12/1997 | Tsai | |
| 5,702,090 A | 12/1997 | Edgman | |
| 5,743,064 A | 4/1998 | Bennet | |
| 5,887,386 A | 3/1999 | Alexanian et al. | |
| 5,890,702 A * | 4/1999 | Lubore | 256/19 |
| 5,899,442 A * | 5/1999 | Meglino et al. | 256/32 |
| 5,931,450 A | 8/1999 | Yoder | |
| 6,027,104 A | 2/2000 | Alexander et al. | |
| 6,126,145 A | 10/2000 | Mohr | |
| 6,126,146 A | 10/2000 | Melton | |
| 6,128,857 A | 10/2000 | Morgan et al. | |
| 6,260,828 B1 | 7/2001 | English | |
| 6,260,829 B1 | 7/2001 | Anderson et al. | |
| 6,293,523 B1 | 9/2001 | Fendler | |
| 6,460,829 B1 | 10/2002 | Forbis et al. | |
| 6,669,175 B2 * | 12/2003 | Snow et al. | 256/32 |
| 6,676,113 B2 * | 1/2004 | Christensen et al. | 256/25 |
| 7,032,891 B2 | 4/2006 | Rowley et al. | |
| 7,040,605 B2 * | 5/2006 | Lappen | 256/10 |
| 2001/0033911 A1 | 10/2001 | Jolliffe | |
| 2001/0052595 A1 | 12/2001 | Hulett | |
| 2002/0070377 A1 | 6/2002 | Erwin | |
| 2003/0020057 A1* | 1/2003 | Sciandra | 256/24 |
| 2003/0160225 A1 | 8/2003 | Osipovs | |
| 2004/0089858 A1 | 5/2004 | DeRogatis et al. | |
| 2005/0263750 A1* | 12/2005 | Fielden et al. | 256/24 |
| 2006/0033092 A1* | 2/2006 | Camacho | 256/32 |

FOREIGN PATENT DOCUMENTS

| | | |
|---|---|---|
| GB | 2 245 611 A | 1/1992 |

OTHER PUBLICATIONS

Wiremold, Wire & Cable Management Systems brochure page, dated Nov. 2001, 1 page.

Herzfeld, Stephanie, "Look, From Upscale Closet Systems to Shiny Metal Finishes, Here are the 100 Products Builders and Remodelers Wanted To Know More About", *Building Products*, May/Jun. 2002, pp. 37-38.

"research Material MFR" email, sent by sender Daemon@email-delivery.infotrac-custom.com, Aug. 1, 2002, one page.

Slatwall Aluminum Inserts Plastic and Vinyl Inserts, "Slatwall Display Store Fixtures.com", available on the internet at: http://www.slatwall-display-store-fixtures.com... as of Aug. 5, 2002, 5 pages.

Store-Display Slatwalls and Accessories—"Slatwall Accessories", available on the Internet at: http://www.store-display.com... as of Aug. 7, 2002, 3 pages.

Slatwall Accessories-, available on the Internet at: http://www.slatwall-display-stor-fixtures.com/slatwall_display_panels.htm as of Aug. 7, 2002, 1 page.

Slatwall Accessories-, available on the Internet at http://www.slatwall-display-stor-fixtures.com/slatwall_brackets.htm as of Aug. 7, 2002, 1 page.

International Hardware Week—"The Grabbee", available on the Internet at http://www.internationalhardwareshow...../menu... as of Aug. 14, 2002, 2 pages.

The space saver Adjustable balcony table—"Adjustable Francais", available on the Internet at: http://www.farleytechnologies.com/adjustable/index.htm as of Aug. 14, 2002, 2 pages.

Stallion Fence Home—"Manufacturer of Premier Quality PVC Fence Caps", available on the Internet at: http:www.stallionfence.com/home... as of Aug. 19, 2002, 1 page.

Low Voltage Lights, available on the Internet at http://www.stallionfence.com/products... as of Aug. 19, 2002, 1 page.

Flexfence—The Hardware, "One Simple Hardware Kit... Hundreds of Design Possibilities!", available on the Internet at: http://www.flexfence.com/hw.html as of Aug. 19, 2002, 1 page.

Flexfence—"One Simple Hardware Kit . . . Hundreds of Design Possibilities!", available on the Internet at: http://www.flexfence.com/home.html as of Aug. 19, 2002, 3 pages.

Flexfence—The Hardware Dimensions, "Instructions for other distance openings", available on the Internet at: http://www.flexfence.com/hw.html as of Aug. 19, 2002, 1 page.

Hunter Douglas—"Millennia Vertical Blinds—Product Overview", available on the the Internet at: http://www.hunterdouglas.com/millennia/product_overview/html as of Aug. 19, 2002, 1 page.

Levolor—"Features", available on the Internet at: http://www.levolor.com/main.... as of Aug. 19, 2002, 3 pages.

Lifestyle Fences—What's New, "Louver Style", available on the Internet at: http://www.fence.co.nz/...whatsnew.... as of Aug. 19, 2002, 2 pages.

Lozier Corporation—Display Shelving Components, available on the Internet at: http://www.lozier.com/..... as of Aug. 19, 2002, 2 pages.

Cable Management, "Hinged Cover Raceway", available on the Internet at: http://www.rackittechnology.com/ as of Aug. 19, 2002, 2 pages.

Patio Lace PVC Victorian Style Millwork—Patio Lace SlipClips Page—available on the Internet at: http://www.woodshop.net/Patio_Lace/pl_slipclips.htm as of Aug. 24, 2002, 1 page.

Perma Cap Vinyl Bleacher Covers —"Perma-Cap® Vinyl Bleacher Covers. Colorful, Cost-Effective, And Never Need Refinishing!", available on the Internet at: http://www.perma.com.com as of Aug. 24, 2002, 4 pages.

Crane Plastics—available on the Internet at: http://www.crane-plastics.com/ as of Sep. 24, 2002, 3 pages.

Perimeter Applications—"Perimeter Fence Applications", available on the Internet at: http://www.fibersensys.com/applications/preimeter.htm as of Oct. 2, 2002, 3 pages.

CableRail Aluminum Component Railing System—"Feeney Wire Rope & Rigging Manufactures of the CableRail™ Line of Products", available on the Internet at: http:www.sweets.construction.com.... as of Oct. 5, 2002, 2 pages.

MicroStarTM—The MicroStar™ by Suncor Stainless, available on the Internet at: http://www.microstar.....com/... as of Oct. 5, 2002, 4 pages.

Centaur HTP—Centaur HTP Fencing, "Centaur HTP", available on the Internet at: http://www.centaurhtp.com/centaur.htm as of Oct. 14, 2002, 1 page.

Three Distinctive styles for a Variety of Uses—available on the Internet at: http://www.discountfence.com/Stud%20Rail/stud_rail_farm_and_pasture_fence.htm as of Oct. 14, 2002, 1 page.

"Spur HTP" website, made publicly available by Centaur HTP at http.//www.centaurhtp.com/spur.htm, Oct. 14, 2002, one page.

"PolySite HTP" website, made publicly available by Centaur HTP at http.//www.centaurhtp.com/polysite.htm, Oct. 14, 2002, one page.

"PolyCharge HTP" website, made publicly available by Centaur HTP at http.//www.centaurhtp.com/polycharge.htm, Oct. 14, 2002, one page.

"New Quick-Connect Nozzle Systems" advertisement, published by Spraying Systems Co., while the date of publication is unknown it is believed that the advertisement was published prior to Nov. 16, 2002, one page.

"Special Purpose Nozzles—Metal Pretreatment" advertisement, publication source unknown, while the date of publication is unknown it is believed that the advertisement was published prior to Nov. 16, 2002, one page.

"Home Networking" web page, made publicly available by Technocophobia at an unknown website, while the date the website was made publicly available is unknown it is believed that the website was publicly available prior to Nov. 16, 2002, two pages.

"Kyocera Solar Direct" advertisement, published by Kyocera Solar, Inc., while the date of publication unknown it is believed that the advertisement was published prior to Nov. 16, 2002, one page.

"Colored Decorative Cap Rail Offers Fresh Look," publication source unknown, while the date of publication is unknown it is believed that the advertisement was published prior to Nov. 16, 2002, one page.

"Protective 14 Ft Trampoline Screen: $" web page, made publicly available by Trampolines.com at http://www.trampolines.com/trampolines.html, Nov. 21, 2002, one page.

Kersting, Barbara, "Making Sense of New-Age Fence", *Centaur publication*, while the date of publication is unknown it believed that the article was published prior to Jan. 21, 2003, pp. 39-49.

Gregory Fence Products brochure pages, "Installation Is As Easy As . . . ", undated but prior to Jan. 21, 2003, 2 pages.

Patwin Plastic Products Specialists brochure pages, "Pricing Tag Molding, Slatwall and Slatwall Accessories", undated but prior to Jan. 21, 2003, pp. 47, 48, 53, 54 and 55.

The Royal Deck™ brochure pages, undated but prior to Jan. 21, 2003, 4 pages.

Classy Caps Mfg. Co. brochure page, undated but prior to Jan. 21, 2003, 1 page.

Stallion Fence Accessories brochrue pages, "Solar & Low Voltage Lighting", undated but prior to Jan. 21, 2003, 2 pages.

Palkar Fence Company brochure page, "Dark Colors in PVC!", undated but prior to Jan. 21, 2003, 1 page.

Crane Plastics brochure pages, "Perma-Cap—Make Every Seat The Best Seat In The Stands", undated but prior to Jan. 21, 2003, 5 pages.

Plastival, Inc. brochure pages for Vecor Railing, Stair Railing and Special Order Fences, undated but prior to Jan. 21, 2003, 2 pages.

Life Long Lattice Fencing System brochure pages, "Modular Fence Kit", undated but prior to Jan. 21, 2003, 2 pages.

Ondura Corporation brochure, "Ondura Brings Home A Distinctive New Look In Roofing", undated but prior to Jan. 21, 2003, 4 pages.

Lowes's Home Improvement Warehouse brochure, "Energy Efficient Beauty That Lasts For Years", undated but prior to Jan. 21, 2003, 4 pages.

Kroy Building Products, Inc. brochure page, "Kroy Fences Make Great Profits", undated but prior to Jan. 21, 2003, 1 page.

Bosch Rexroth Corporation brochure pages, "Bosch Aluminum Structural Framing System", undated but available as of Jan. 21, 2003, 6 pages.

Technology Benxi Ju Feng Company, Liaoning China brochure pages, undated but undated but available as of May 16, 2003, 14 pages.

"New Solar Power Fence System Generates Electricity While Providing Security (Seriously!)", World Fence News, Nov. 2003. p. 61.

\* cited by examiner

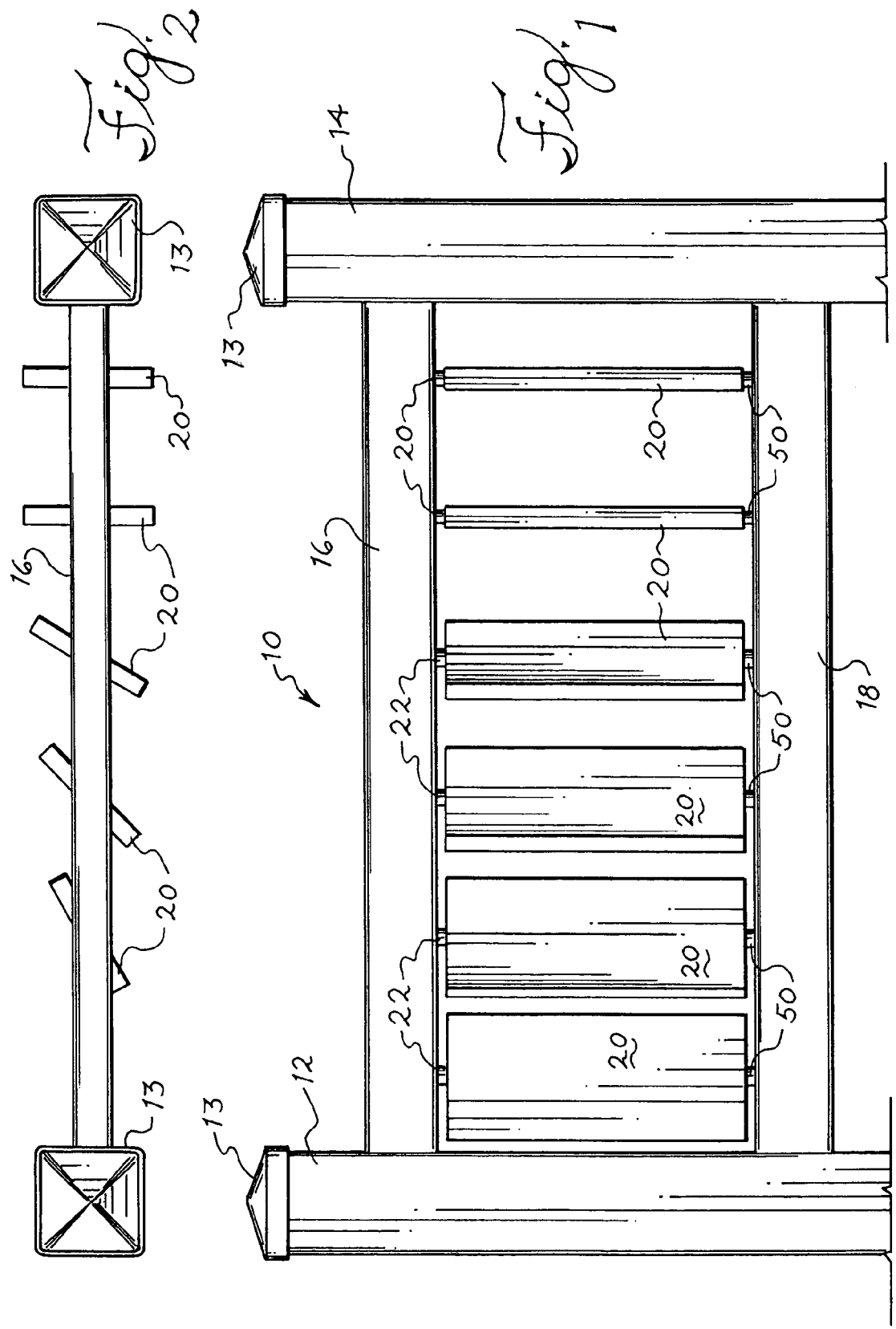

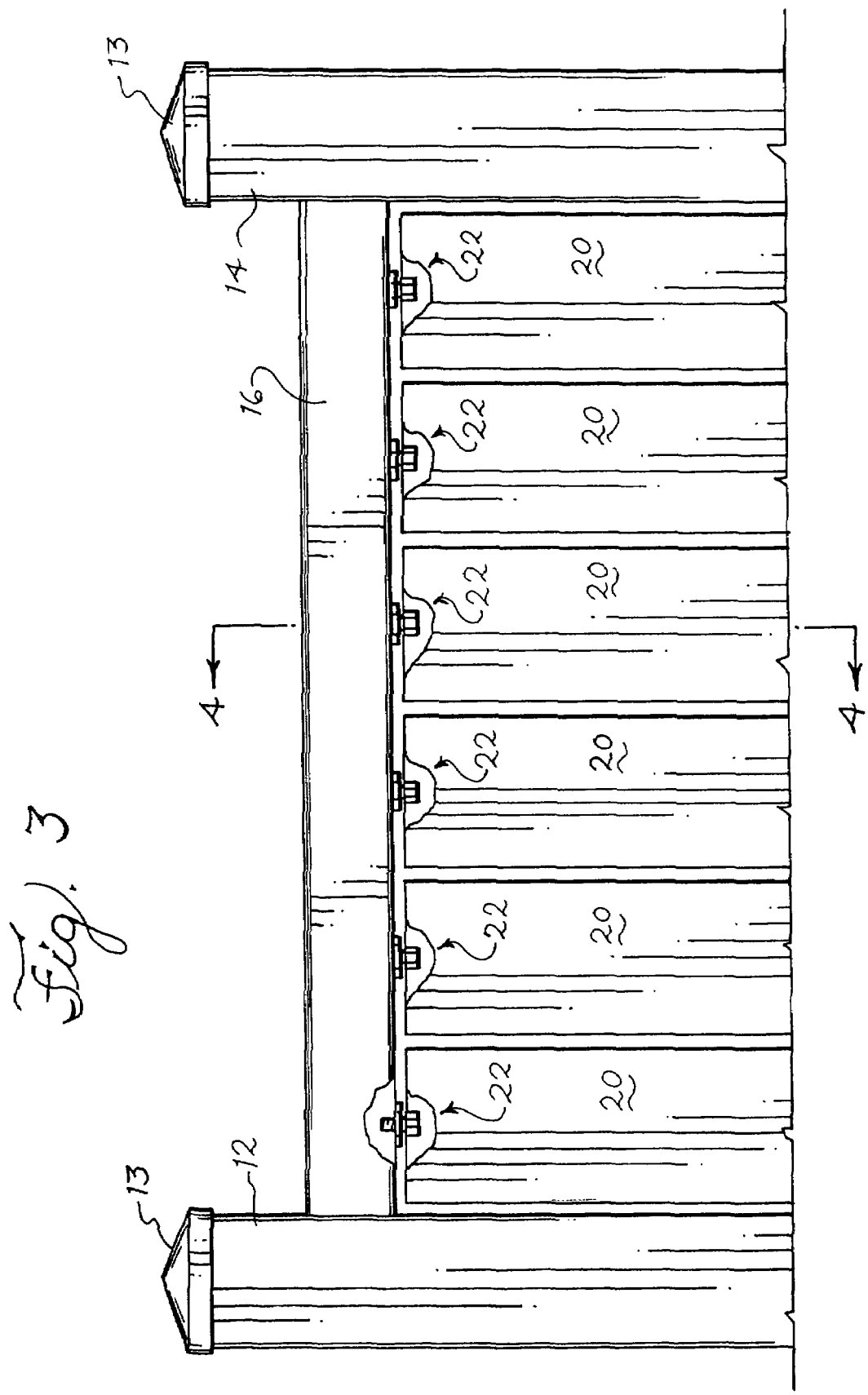

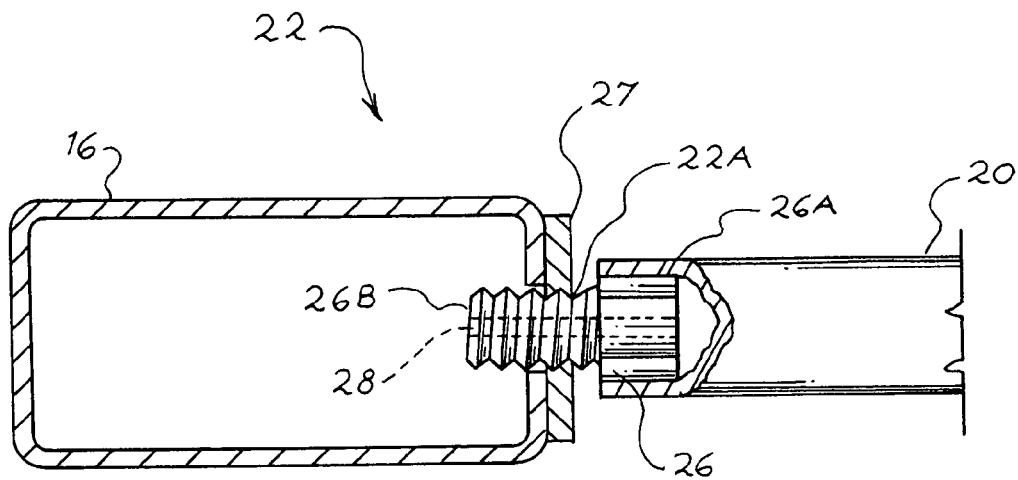
Fig. 4
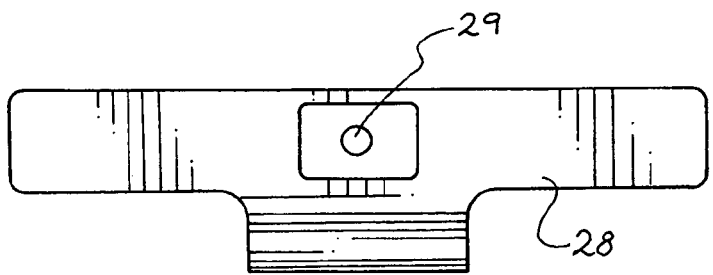
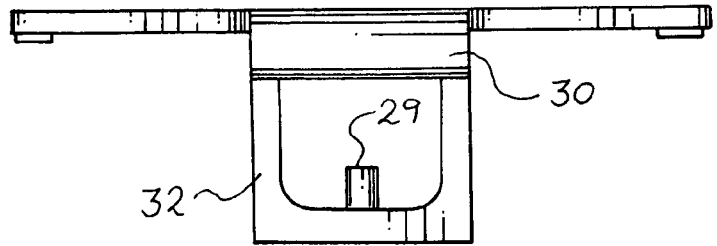
Fig. 5
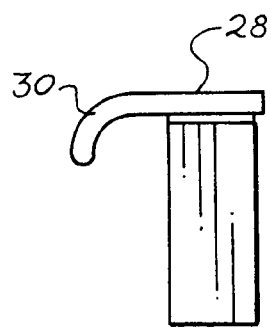
Fig. 6
Fig. 7

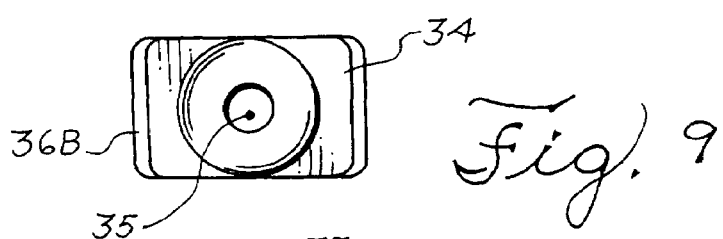
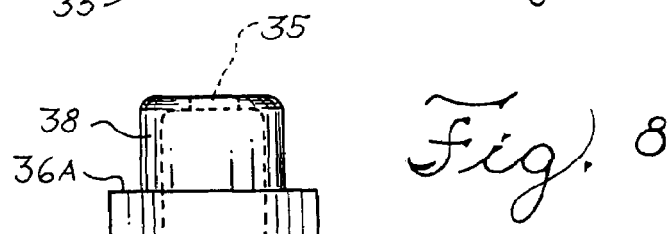
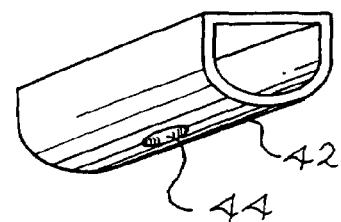
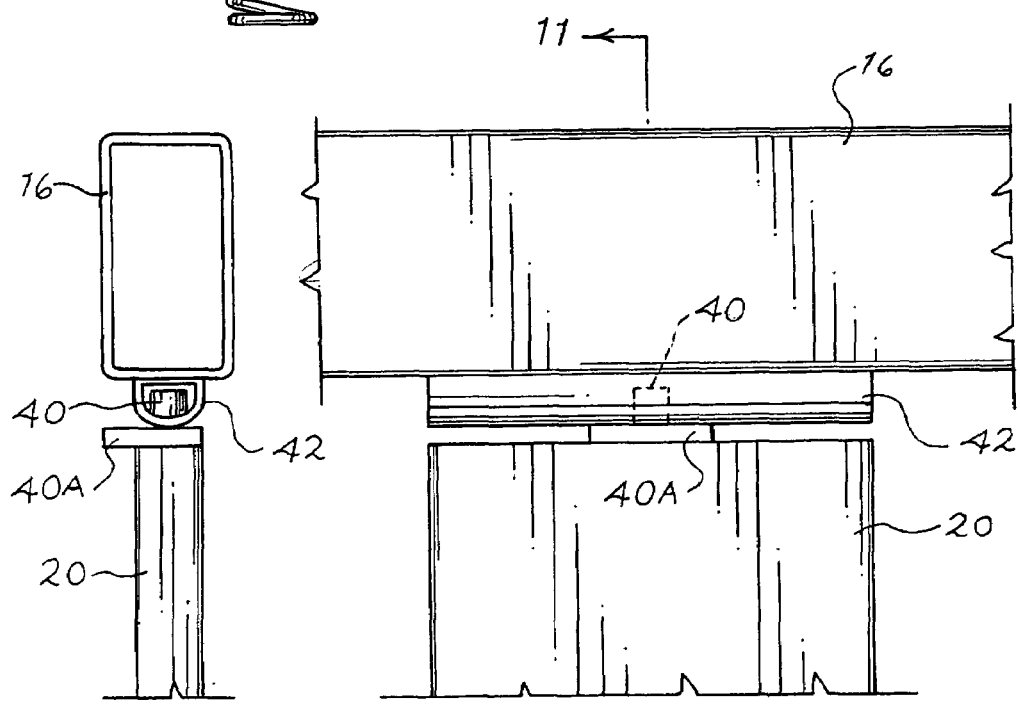

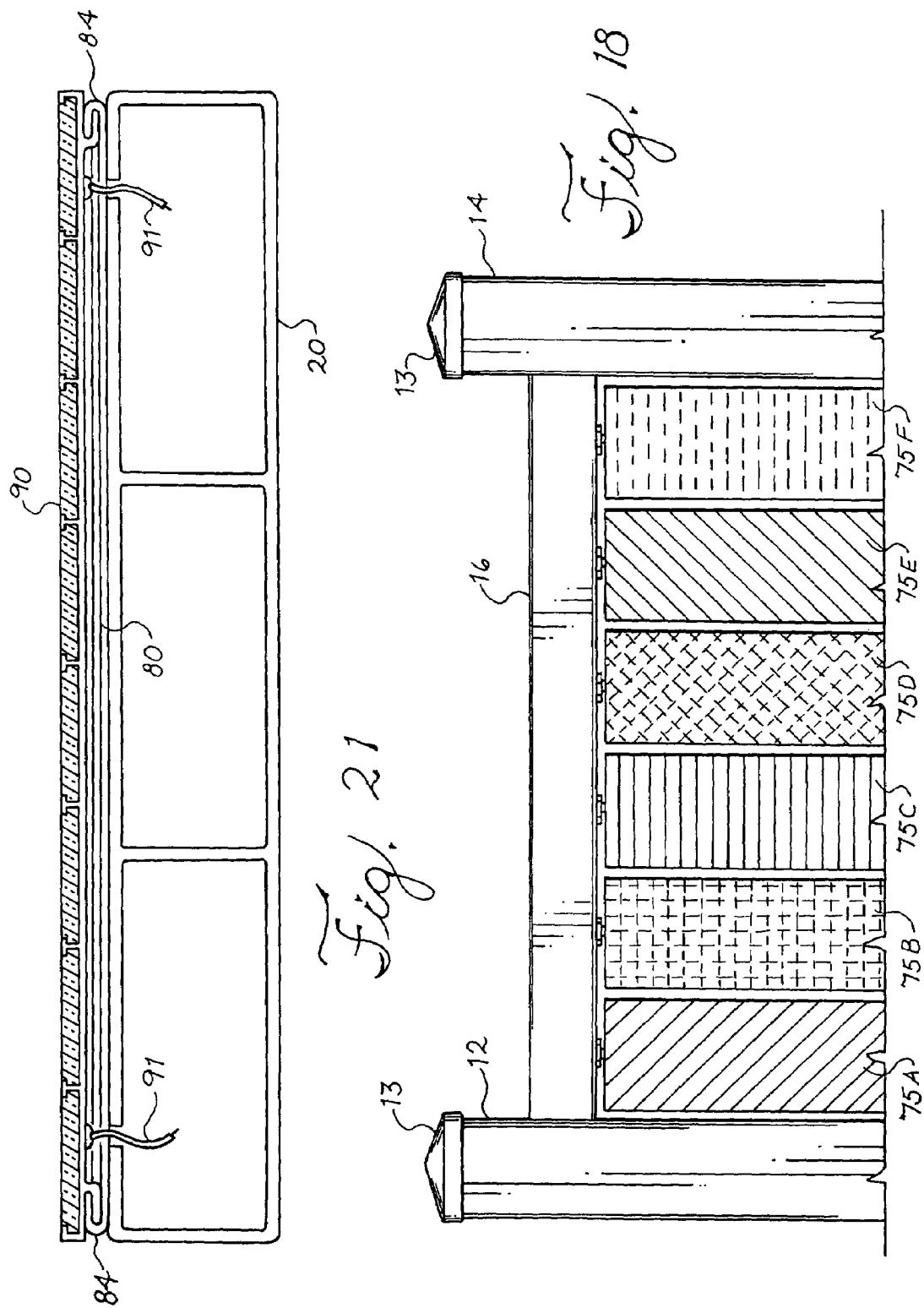

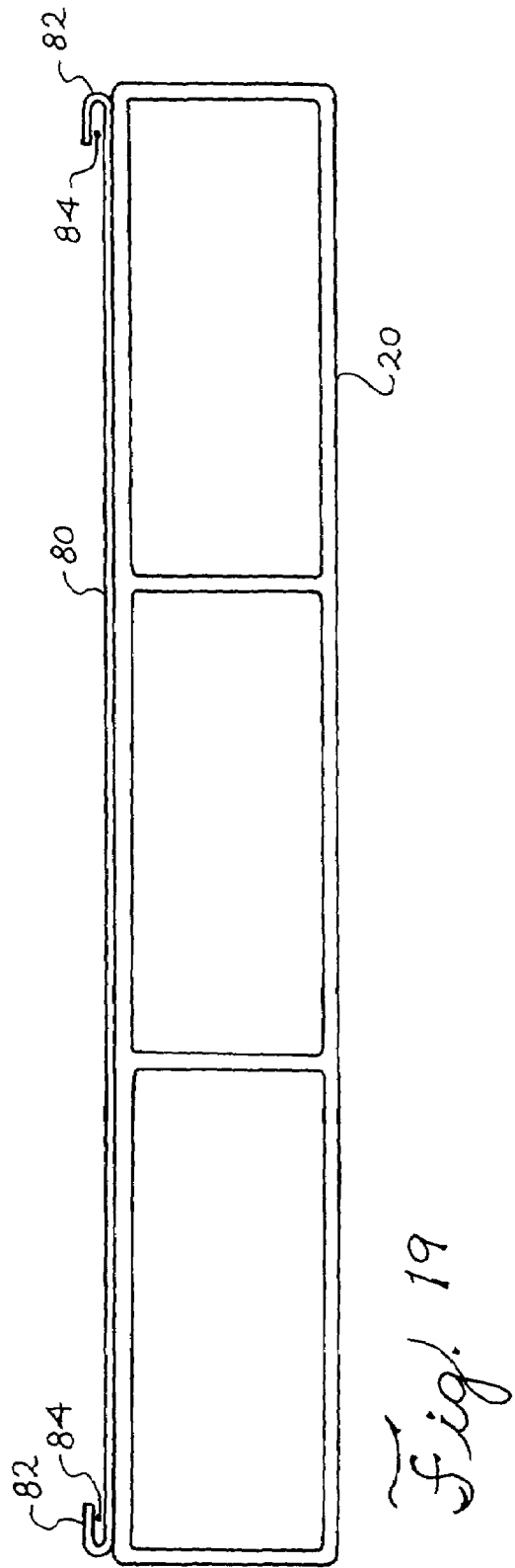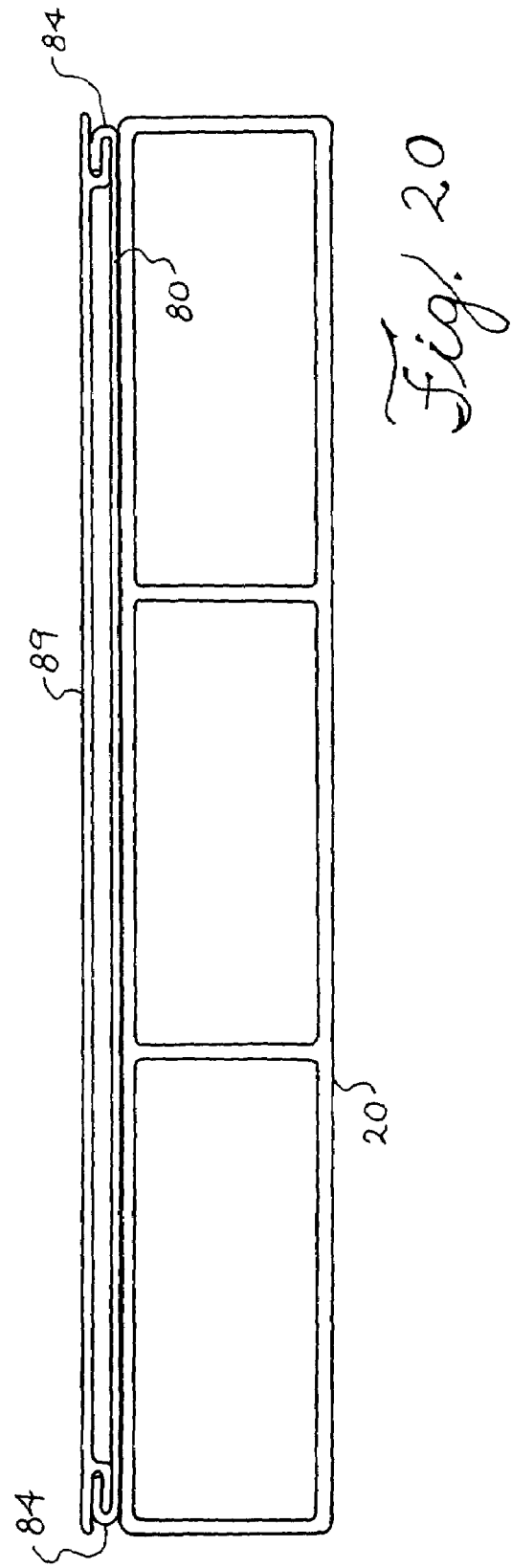

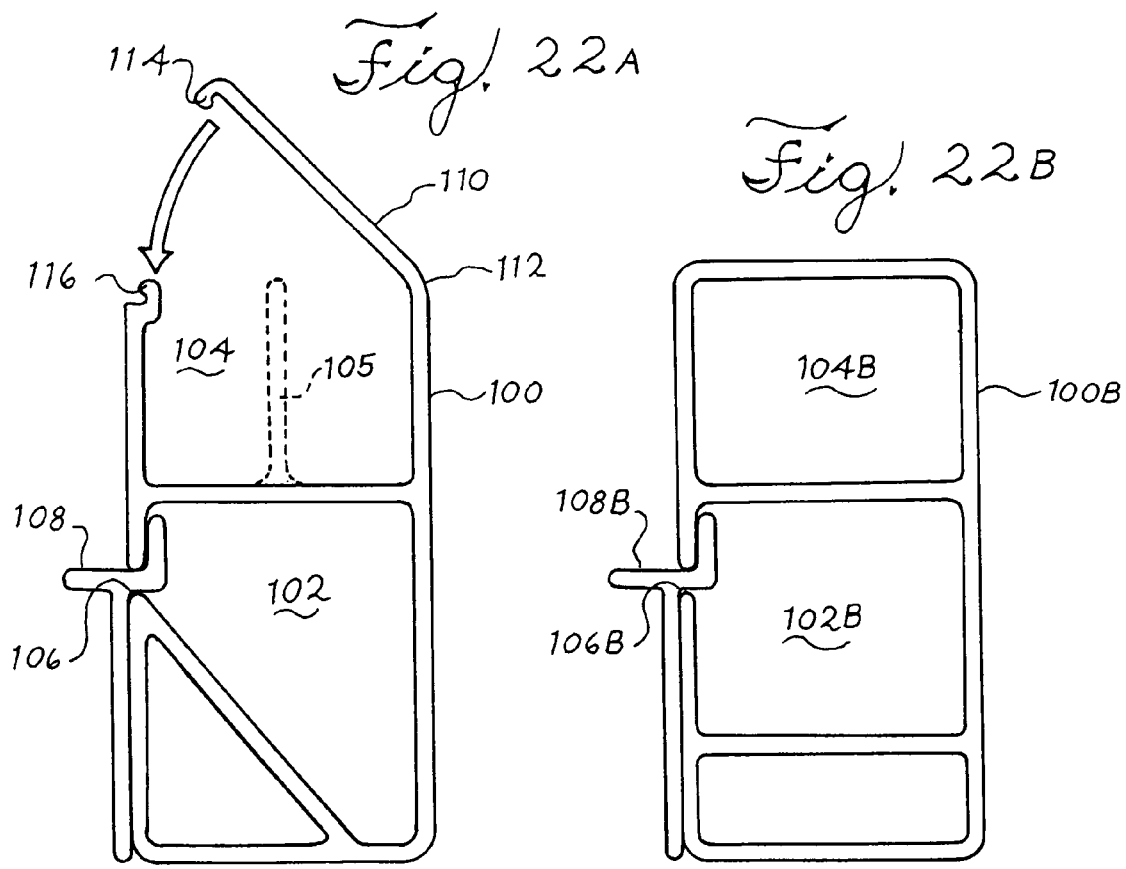
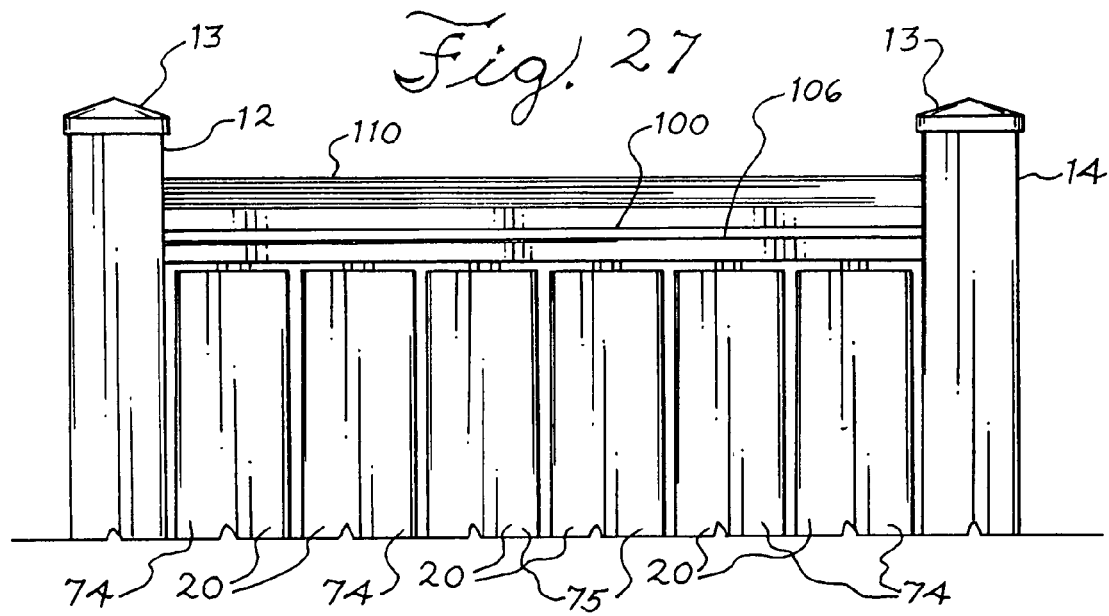

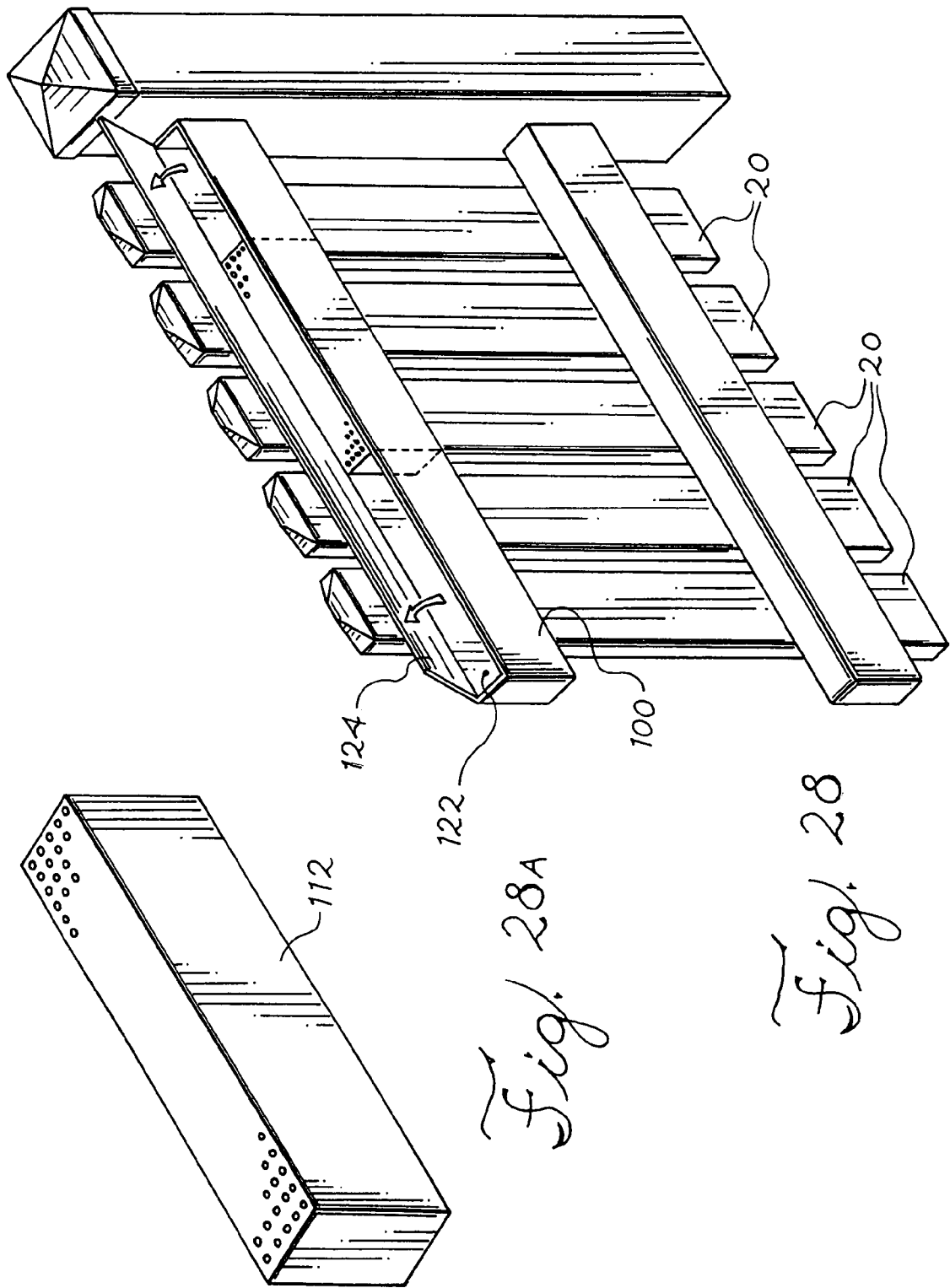

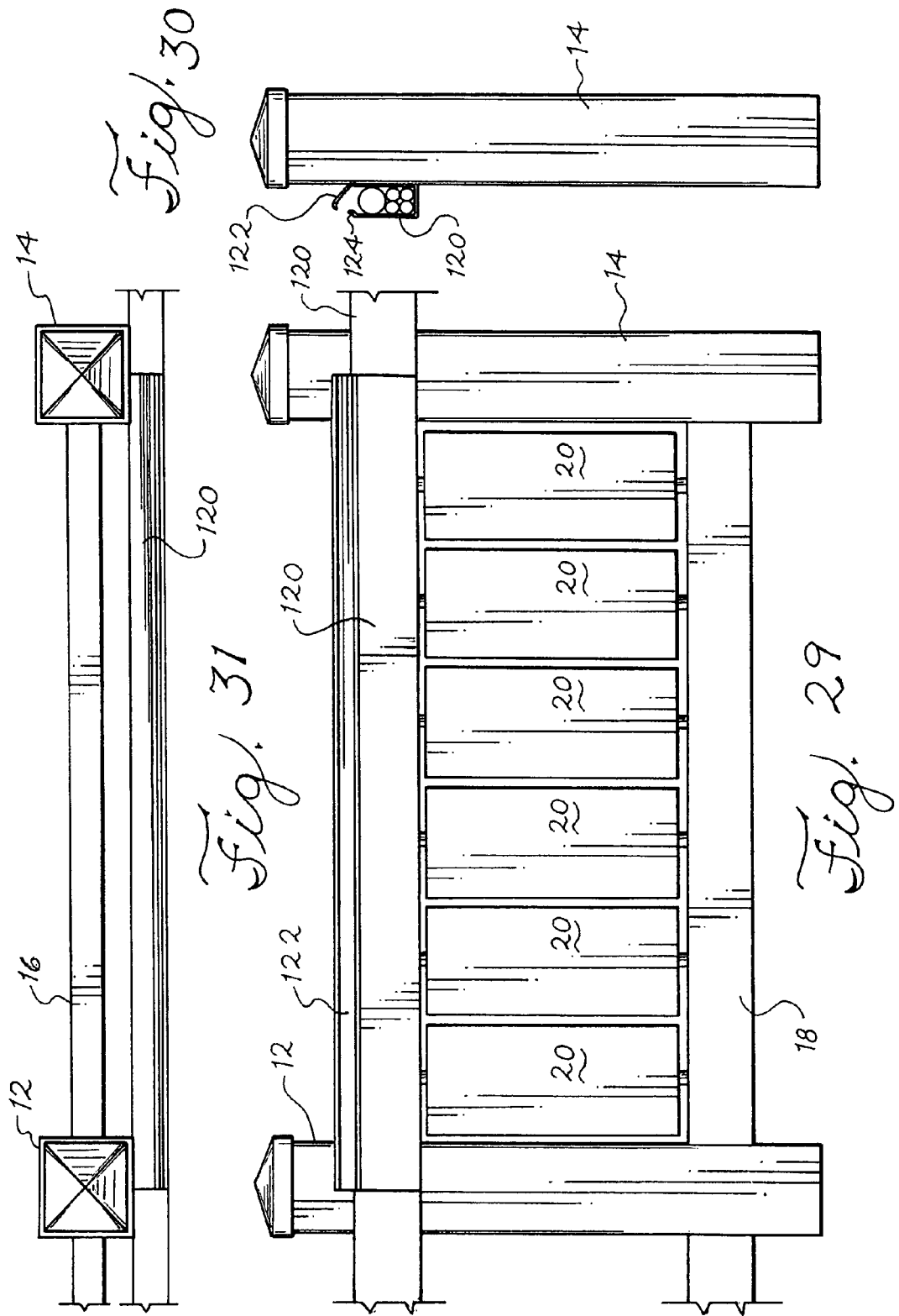

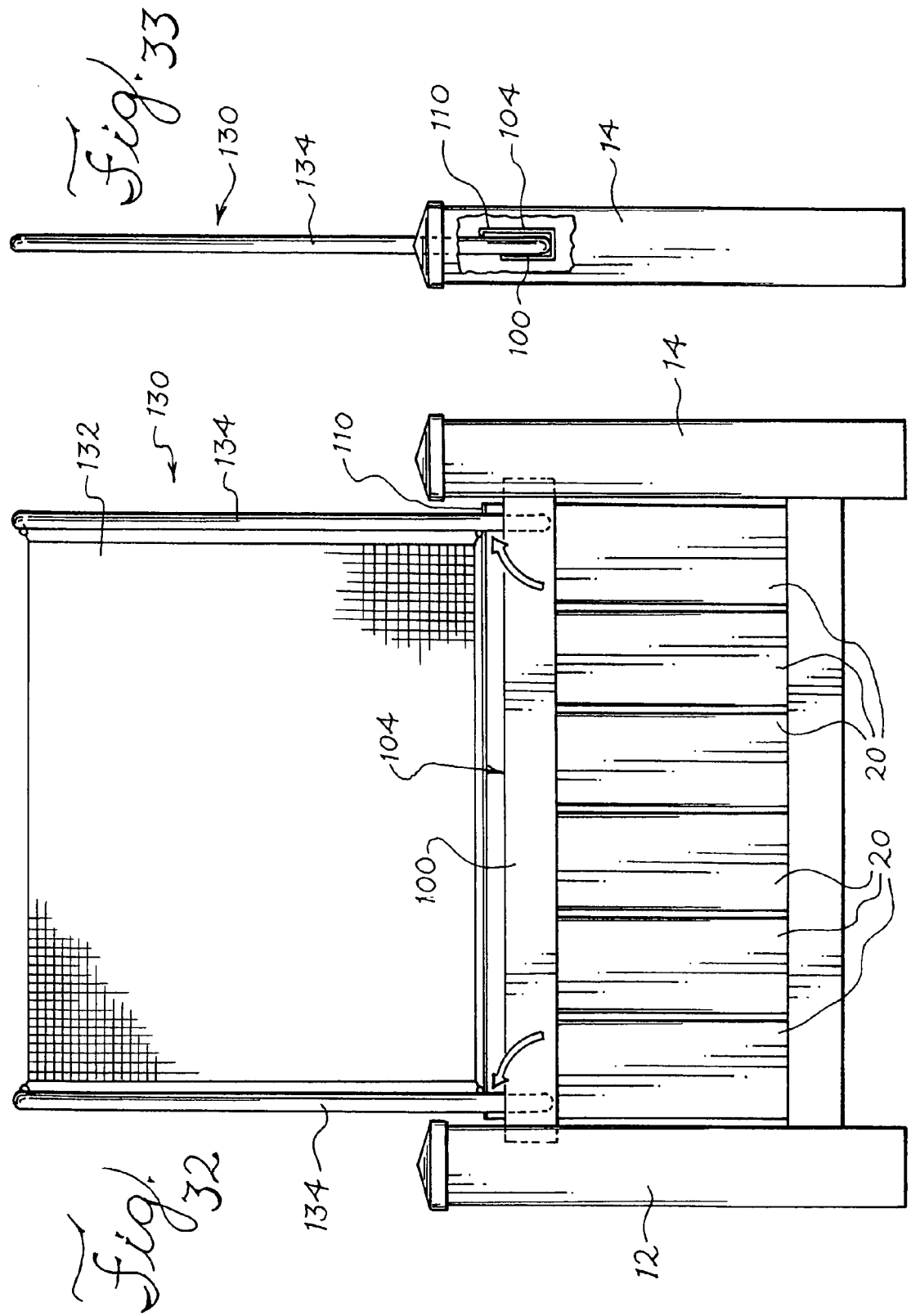

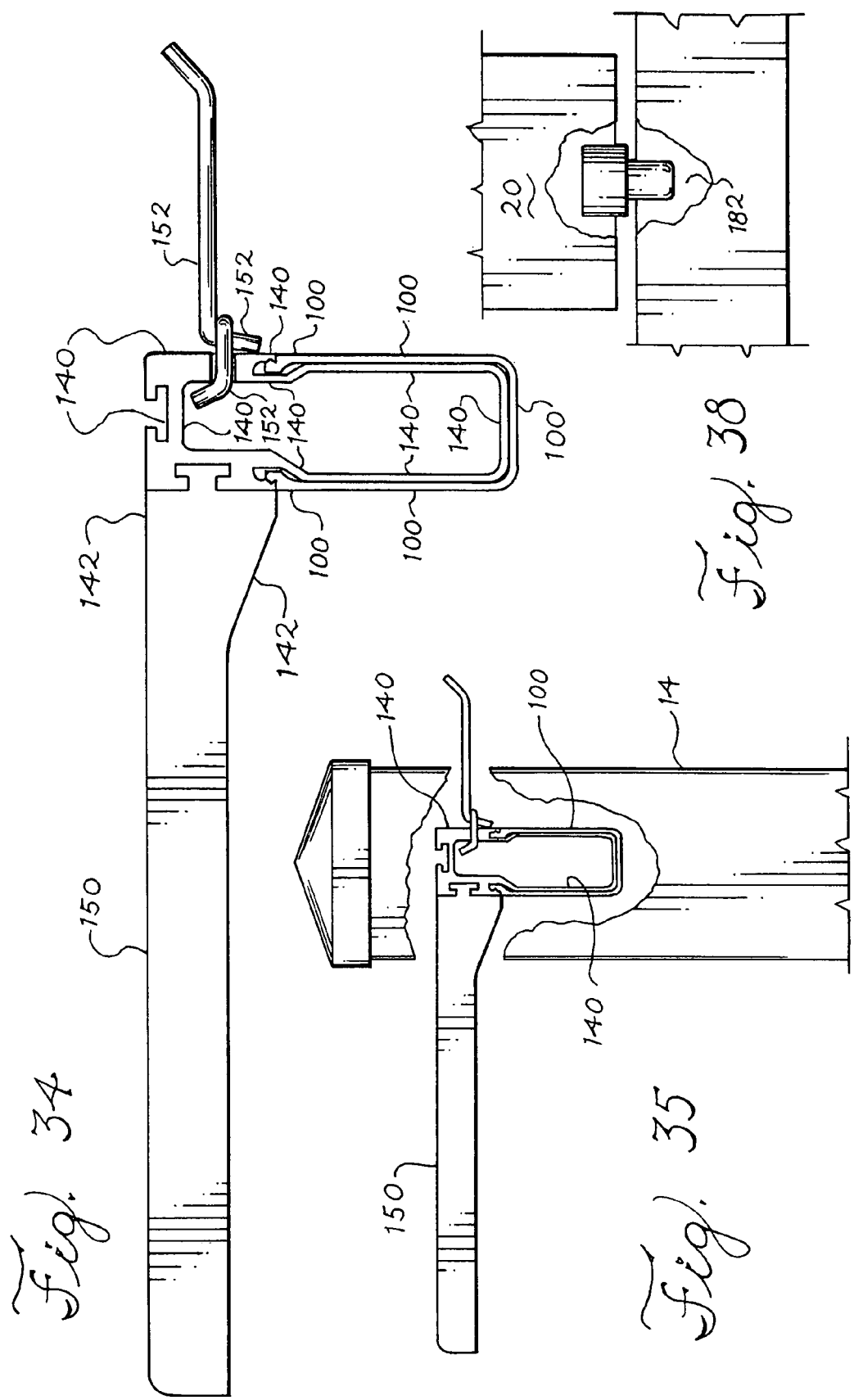

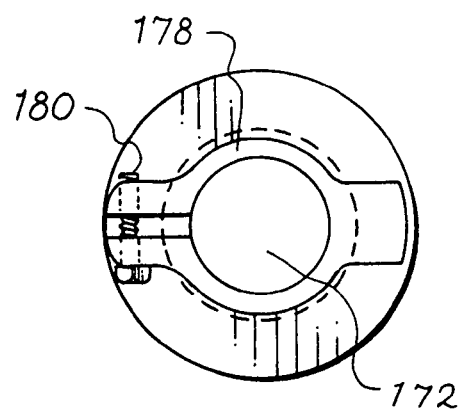
Fig. 37A
Fig. 37
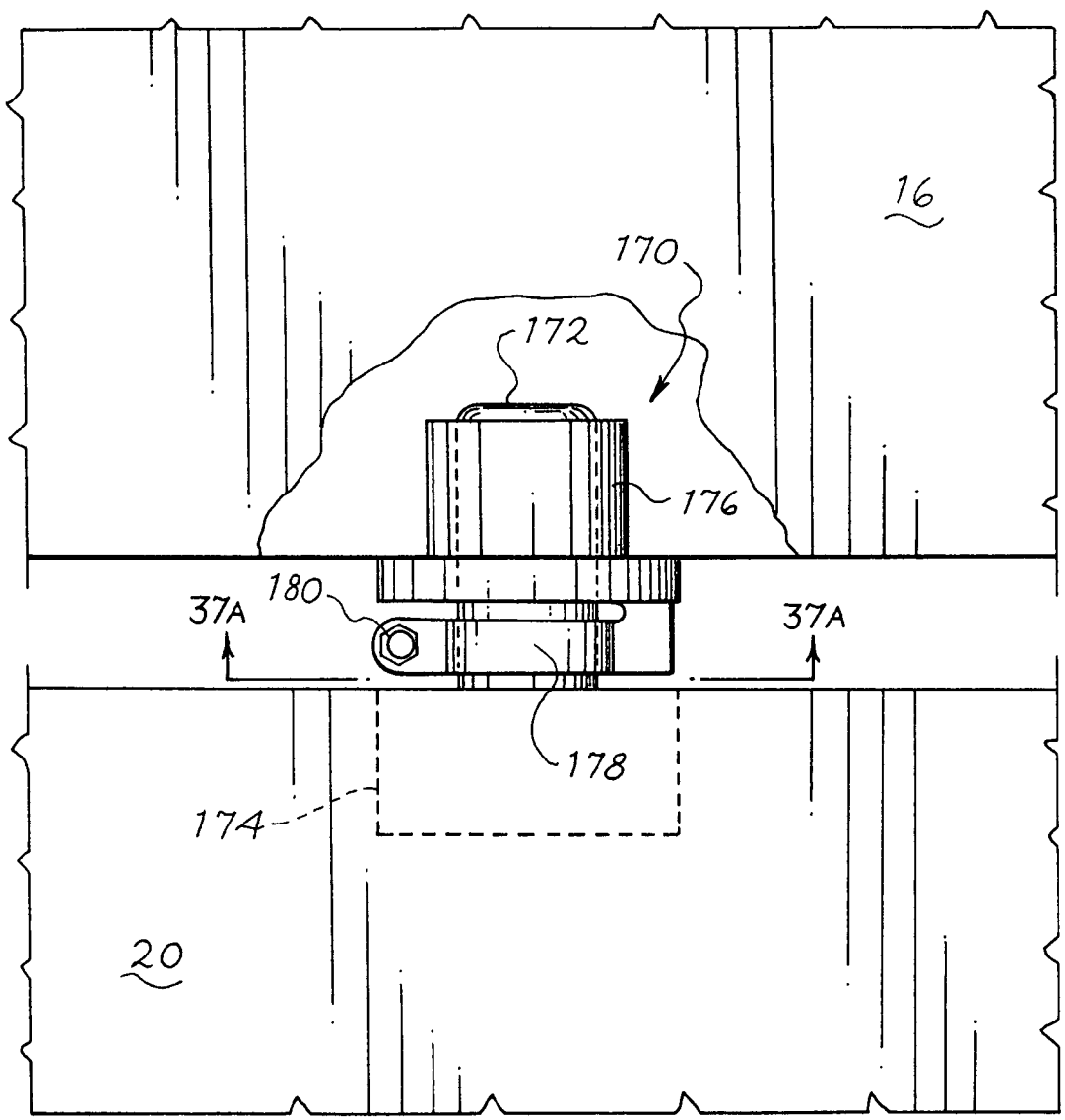

METHODS AND APPARATUS FOR FENCING AND OTHER STRUCTURES

REFERENCE TO RELATED APPLICATIONS

This application is a divisional of U.S. Patent application Ser. No. 10/347,972, filed on Jan. 21, 2003 now U.S. Pat. No. 7,032,891, the entire contents of which are incorporated herein by reference.

This invention relates to improvements in fencing systems and other outdoor structures, and more particularly relates to improved apparatus and methods of construction and use that allows the function and uses of the structure to be expanded and the construction, function and appearance of the structure to be selectively adjusted or changed to meet varying conditions of display and use. The invention is particularly suitable for use with fencing systems and other outdoor structures constructed from plastic materials such as PVC.

BACKGROUND INFORMATION

Fencing is commonly used in public and private locations to provide security by barring entry to the enclosed locations to provide privacy, or to improve the aesthetic appearance of the area. Most fencing has a fixed structural design. The fence remains permanently in essentially the same condition of appearance and use after it is installed in the desired location. Expensive maintenance is often required to preserve the original condition of the fence. Any substantial change in the function, use or appearance of the fence usually requires laborious activity such as reconstruction or painting. These prior fence constructions are not adaptable for performing additional functions and are not changeable or adjustable to provide the fence with a new or different use or appearance.

The arrangement and appearance of the fencing are particularly static or difficult to change when the fence is constructed of plastic materials such as polyvinyl chloride (PVC) and the like, a type of fencing that is becoming increasingly more prevalent. Plastic fencing typically must have a selected design and be manufactured, such as by molding or extrusion off-site at a factory. Only minor variations in the structure of the PVC or other plastic fencing can be accomplished at the site where the fence is to be installed to vary the use or appearance of the structure or adapt the structure to perform additional functions. Major changes in construction or design would require costly changes to the manufacturing process to create the different parts of a fence at the factory. The costs of storing or inventorying the number of different component parts having different functions or appearances is also very substantial.

The color and appearance of PVC or other plastic fencing or outdoor structures such as railing and decking are also difficult to change. Plastic materials are susceptible to degradation in sunlight due to the effect of ultraviolet rays. A plastic composition including titanium dioxide, a well known white pigment, provides a measure of protection from this potential degradation of the material when exposed to an outside environment. As a result, plastic fencing is usually a white or light color when treated with titanium dioxide or the like to minimize the possibility of degradation that may occur.

Some of these same disadvantages also arise with other outdoor structures, such as an outside rail or a deck that is constantly exposed to the elements. For example, it is difficult to change the function or appearance of an outdoor rail or deck component once it is installed in place, particularly if the structure is constructed from a plastic material such as PVC. Substantial costs would also be involved in attempting to manufacture and inventory the different components needed to selectively change the function or appearance of the structure.

Many current designs for fencing, railings and decks are also difficult to use with electrical wires, or fluid or air lines, and cannot readily accommodate the addition of useful attachments such as hangers for tools or utensils, work or support surfaces or the like. Such additional features and functions are particularly difficult to add to a fence or other structure manufactured at an off-site factory from a plastic material such as PVC. Many prior structures would have to be substantially reconstructed or replaced to be useful with electrical wires, fluid lines or various attachments.

BRIEF SUMMARY

This invention provides improved apparatus and methods of construction and use for fencing and other outdoor structures that allow the structure to be readily adapted to perform additional functions or changed to vary the use or appearance of the structure. In utilizing this invention the fencing, as an example, would not merely perform a static function such as dividing areas, providing privacy or barring entry to an area. With this invention the structure is readily adapted for additional features or functions and can be changed or adjusted easily for a different appearance or use. A fence incorporating this invention can be adapted or adjusted selectively to adapt to changes in lighting, such as changes in sunlight; to vary viewing or privacy conditions; to enhance security; to regulate ventilation or airflow; to collect solar energy; to adapt the structure to accommodate changes in seasons or holidays; to attach implements, tools or decorative items, to provide distribution channels for electrical wiring or air or water conduits, and to permit other desired adjustments or changes. The adjustable components of the fencing can be releasably locked into the selected position after the desired adjustment is made. In one aspect of the invention the improved structure provides a readily accessible compartment or pathway for receiving devices such as wiring or fluid lines, for storing items such as wires and hoses or for retaining items such as floral or garden arrangements, bird seed feeders or the like. The improved structure further includes an attachment feature that allows other components such as hangers or support structures to be easily attached.

The invention further provides apparatus and methods to readily change the appearance of the structure to suit particular needs or desires. The structure such as a fence, railing or deck component can be varied after installation by changing the color, texture or other appearance of the structure in a low-cost and efficient manner. By utilizing this invention with PVC or other plastic fencing, railing or decks can be changed from the traditional light or white colors to other shades of colors including darker colors and/or different textures. Changes in the appearance of the structure can be done to accommodate the changes in seasons or holidays, to match or coordinate with the colors of other structures such as adjacent houses, to improve visibility or safety, or to suit other needs or desires of the user.

In general the present invention relates to a method and apparatus for an outdoor structure that is capable of adjustment to vary the conditions of use. When used as a fence, this system includes fence rails for supporting a portion of the fence and movable fence members. Supporting structure support the fence members on the rails and allows them to be selectively adjusted to a plurality of positions and releasably locked into these selected positions. The invention provides a method and apparatus for altering or modifying the appearance of an outdoor structure such as a fence, railing or deck member. Each of the outdoor members include a structure having a selected face provided with a gripping element. A separate panel having a different selected appearance or color is engaged with the gripping element to. modify the face of the outdoor structure. The member in accordance with invention further can define a compartment or pathway which is readily accessible and closable for receiving and storing a variety of objects.

Further objects and advantages of the present invention will become apparent from a description of the several embodiments as set forth in the following description and drawings.

BRIEF DESCRIPTION OF THE DRAWINGS

FIG. 1 is a side elevation view of an adjustable fence in accordance with this invention;

FIG. 2 is a top plan view of the adjustable fence shown in FIG. 1;

FIG. 3 is a side elevation view of the fence shown in FIG. 1 with a portion of the fence components cut-away to show one embodiment for the adjustable support and fastening system of the fence;

FIG. 4 is a cross-sectional view taken along the line 4-4 in FIG. 3 showing a cross-section of the support and fastening means in more detail;

FIG. 5 is a front elevation view of a plunger housing for a second embodiment for the adjustable support and fastening system for the fence;

FIG. 6 is a top view of the plunger housing as shown in FIG. 5;

FIG. 7 is a side elevation view of the plunger housing shown in FIGS. 5 and 6;

FIG. 8 is a front elevation view of a plunger for use with the housing shown in FIGS. 5 through 7;

FIG. 9 is a top view of the plunger shown in FIG. 8;

FIG. 10 is a front elevation view of a third embodiment for the adjustable support and fastening system for a fence in accordance with this invention;

FIG. 11 is a side cross-sectional view of the system taken along the line 11-11 in FIG. 10;

FIG. 12 is a perspective view of the collapsible tensioning insert used in the third embodiment of the fence support and fastening system shown in FIGS. 10 and 11;

FIG. 18 is a front view of a fence system depicting several illustrative changes which can be made to the structure shown in FIGS. 16-17;

FIG. 19 is a cross-sectional view of a still further embodiment of the present invention showing another structure for changing the appearance or function of a fence or outdoor structure;

FIG. 20 is a cross-sectional view of the embodiment shown in FIG. 19 with a changeable insert in place; and FIG. 21 is a cross-sectional view of a structure including a changeable insert in the form of a solar panel;

FIG. 22A is a cross-sectional view of an improved fence rail in accordance with this invention provided with an openable first compartment and an attachment system which also provides an additional accessible compartment;

FIG. 22B is a cross-sectional view of a second embodiment for a modified fence rail;

FIG. 27 is a front elevational view of a fence system including an improved fence rail and adjustable fence members.

FIG. 28 is a perspective view of a fence system adapted to support removable containers such as flower boxes, bird feeders and the like;

FIG. 29 is a front elevational view of a fence rail with a compartment or pathway retrofit to an existing fence;

FIG. 30 is an end view of the fence in FIG. 29;

FIG. 31 is a top view of the fence in FIG. 29;

FIG. 32 is a front view of a further embodiment of the fence system;

FIG. 33 is a side view of FIG. 32;

FIG. 34 is a cross-sectional view of a universal attachment mechanism that can be incorporated into a fence system;

FIG. 35 is a partial sectional view of a fence including the universal attachment mechanism;

FIG. 37 is a partial sectional view of a further embodiment for an adjustable outdoor structure provided with support members that allow for infinite adjustment;

FIG. 37A is a removed top view of a clamp mechanism shown in FIG. 37; and

FIG. 38 is a partial elevational view of a pivot support for use with the system shown in FIG. 37.

DETAILED DESCRIPTION OF THE DRAWINGS AND THE PRESENTLY PREFERRED EMBODIMENTS

Figure 13:
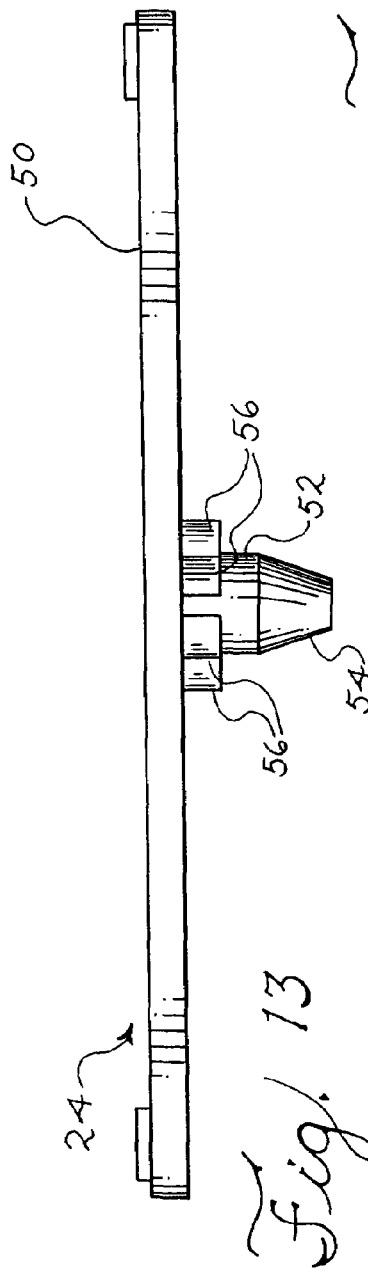
FIG. 13 is a front elevation view of further components of the adjustable support and fastening system for the fence in accordance with the present invention.

FIG. 1 illustrates a front elevational view of a portion of the fence 10 constructed in accordance with the present invention. The fence 10 includes vertical fence posts 12 and 14 and top and bottom horizontal fence rails 16 and 18. End caps 13 are placed on the upper ends of the supporting fence posts 12 and 14. In the preferred embodiments these components of the fence 10 are hollow and can be constructed from plastic materials such as polyvinyl chloride (PVC). The plastic members can be injection or blow molded, or extruded, and the like.

The Fence 10 includes a series of fence members or pickets 20 positioned between the top and bottom fence rails 16 and 18. The illustrated fence members 20 are vertical but the members can be arranged horizontally, diagonally or in other positions that may be desired. These fence members or pickets 20 can be selectively and readily adjusted to change the use, function, or appearance of the fence 10.

FIGS. 1 and 2 illustrate the fence members 20 being positioned in several different orientations for illustrative purposes. As seen in FIG. 1, each fence member 20 is movably supported on the upper fence rail 16 by an upper support structure 22 and supported on another rail 18 by an additional support structure 24. The illustrated fence includes two rails but it will be appreciated that additional rails can be provided on the fence.

FIGS. 3 and 4 illustrate the detailed construction of one embodiment for the upper support structure 22 for each of the fence members 20. As seen in FIG. 4, this upper support structure 22 includes a threaded fastener 26 which is secured by a friction fit, adhesive or other suitable means to an aperture provided in the top of the fence member 20. One end portion of the fastener 26 can take the form of a hex-head 26A and the other end of the fastener includes a threaded portion 26B. The fastener 26 can be provided with an aperture 28 which provides a channel through which components such as electrical wiring, fluid or air lines or the like can be extended to communicate between the inside hollow portions of the rail 16 and the fence member 20.

The fence rail 16 is provided with an aperture which receives the threaded end 26B of the fastening member 26, as illustrated in FIG. 4. The upper support structure 22 also includes a threaded locking nut 27 designed to engage with the threaded portion 26B of the fastener 26. The locking nut 27 is preferably hex-shaped so that it can be rotated manually or by using a conventional wrench or other tool to raise or lower the locking nut 27 on the fastener 26. Rotation of the member 20 is permitted when the locking nut 27 is spaced from the upper rail 16. The nut 27 may be used to lift the member 20 for rotation. This arrangement for the upper support structure 22 permits the fence member 20 to be rotated about a vertical axis by rotation of the fastener 26B within the aperture in the rail 16 and the resulting rotation of the fence member 20 with respect to the rail 16. The locking member, as shown in FIG. 4, is placed between the fence member 20 and the end rail 16 on the fastener 26.

Once the fence member 20 is positioned in the desired location through the rotation about the vertical axis, the locking nut 27 can be advanced on the threaded portion 26B of the fastener 26 against the rail 16 to releasably lock the fence member 20 in the selected position. If it is later desired to move the fence member 20 into a different selective position, the locking nut 27 can be rotated to release the fence member 20 and permit the member to once again rotate with respect to the rail 16. In this manner, the fence member 20 can be moved into a variety of orientations between the upper fence rail 16 and the lower fence rail 18 to adapt the fence for performing additional functions or to give the fence a different appearance.

FIGS. 5 through 9 illustrate a second embodiment for the upper support structure associated with each of the fence members 20. In this embodiment, the top end of each hollow fence member 20 is provided with an end cap 28. This end cap 28 is held in place by a friction fit, adhesive or other suitable means, and includes a tab 30 which can be used to move the fence member 20 for rotation. The tab 30 is preferably positioned on the inside face of the fence member 20 to enhance the security provided by the fence. The end cap 28 also carries a plunger housing 32 which receives a spring loaded plunger 34 having a compression coil spring 39, as shown in FIGS. 8 and 9. A pin 29 within the housing 32 retains the spring 39 in place. A base portion 36 has a circular element 38 and a shoulder 36A. The plunger 34 fits within the housing 32. The circular element 38 is rotatably positioned in an aperture in the lower part of the rail 16 and allows the member 20 to be rotated with respect to the rail. Flange 36B on the plunger base 36 retains the base 36 in place within the plunger housing 32. The shoulder 36B engages the top rail 16 so that the spring 39 urges the member 20 downwardly and releasably secures the member in a selected position by cooperating with the lower support structure 24 of the fence in accordance with this invention. As shown in FIG. 9, an aperture 35 can be provided in the center of the plunger assembly 34 to define a passage for wires or fluid lines or the like and thereby permit communication between the fence member 20 and the hollow rail 16. The fence member 20 can be formed to be hollow or have an opening to receive the wires, fluid lines or other objects.

FIGS. 10 through 12 illustrate a third embodiment for the upper support structure usable in the fence assembly in accordance with this invention. In this embodiment, the upper end of the fence member 20 is provided with a pivot pin 40 and the adjacent lower portion of the upper fence rail 16 is provided with a collapsible tensioning member 42. Preferably, the width of the tensioning member 42 is selected to be at least substantially the same as the width of the fencing member 20, as shown in FIG. 10. Alternatively, the tensioning member 42 can extend along the length of the rail 16 and can be attached to or formed on the rail. In this manner, the open space between the fence member 20 and the rail 16 is closed by the tensioning member 42. The member 42 will thus improve the privacy or protection provided by the fence 10. The lower portion of the tensioning member 42 is provided with an aperture 44 to receive the pin 40, as shown in FIGS. 11 and 12.

In accordance with this embodiment of the invention, the tensioning member 42 is constructed from a pliable material such as flexible plastic or elastomeric material. With this construction, the tensioning member 42 will flex and allow the fence member 20 to be moved against the biasing force of the tensioning member 42. When a moving force is applied to the fence member 20, the collapsible tensioning member 42 allows the member 20 to be rotated into the desired position. The member 42 then applies a tensioning biasing force to the member 20 to releasably secure the fence member 20 in the selected position.

Figure 14:
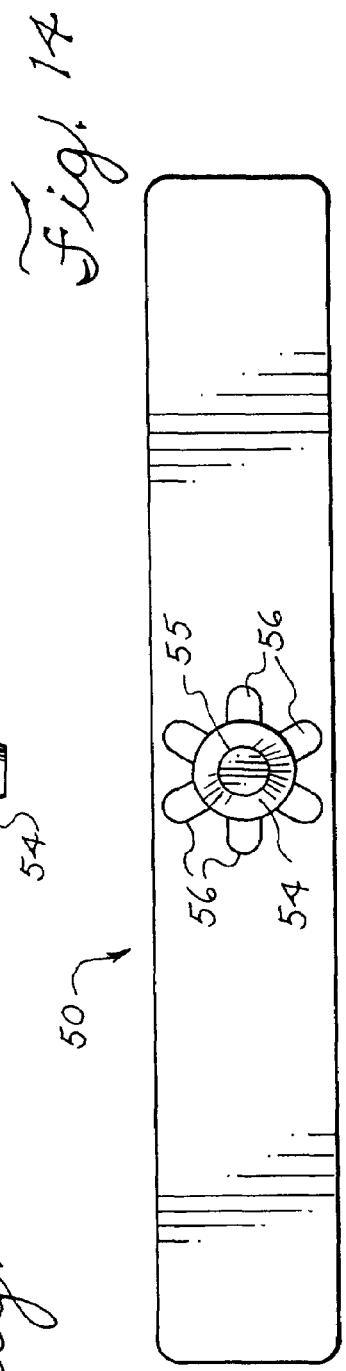
FIG. 14 is a bottom view of the fence components shown in FIG. 13.
Figure 15:
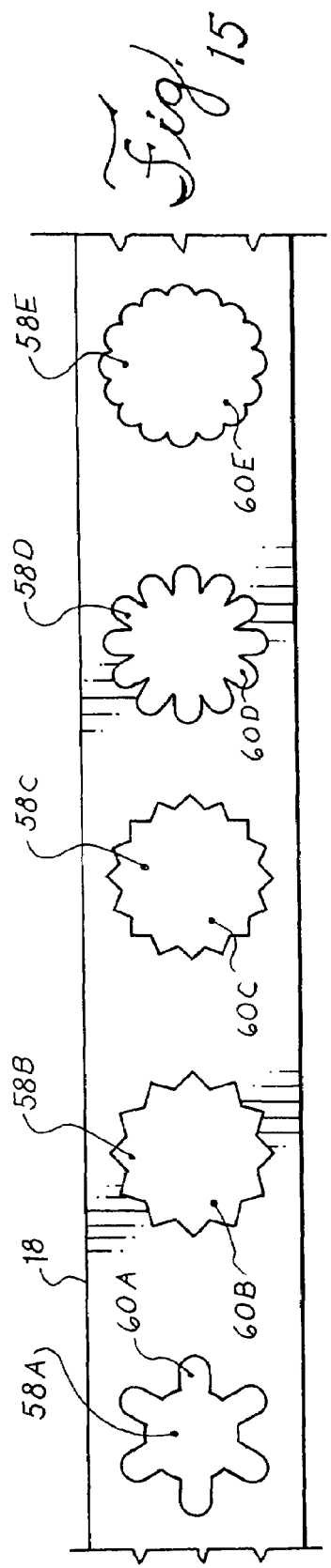
FIG. 15 is a plan view showing optional indexing profiles for use with the adjustable fence system.

FIGS. 13 through 15 illustrate a design for a second support structure 24 for each of the fence members 20 in accordance with the present invention. One component of the illustrated lower support structure comprises an insert 50 designed to be fixed by suitable means to the adjacent end of each fence member 20. The insert 50, as shown in FIG. 13, includes a pivot pin 52 positioned in the central portion of the insert. This pin 52 preferably has a tapered end 54 to facilitate the guiding of the pin 52 into place. The insert 50 further includes detent members 56 which are spaced about the periphery of the pin 52 as shown in FIGS. 13 and 14. These detent members 56 have a selected shape and are positioned around the pin 52 in a uniform pattern. In the illustrated embodiment shown in FIG. 14, the detent members 56 comprise a plurality of radial extensions spaced uniformly 60 degrees apart around the periphery of the pin 52. The pin 52 can also include an aperture 55 defining a passage for wire or fluid or air lines or the like which can be extended between for communication between the interior of the fence member 20 and the interior of the lower rail 18.

FIG. 15 illustrates alternative configurations for the lower rail 18 of the fence 10 in accordance with the present invention. The upper portion of the rail 18 is provided with an indexing and locking aperture 58A configured to receive the pin 52 and engage with detent members 56 on the lower support structure 50. Several alternative locking apertures 58B-E are also illustrated in FIG. 15. Each of these apertures 58A-E have a periphery with a selected pattern of detent surfaces 60A-E designed to cooperate with complementary detent members 56 on the lower support structure 50. The detents 56 can be arranged to be a selected number of degrees apart around the periphery of the pin 54 to be compatible with the corresponding shape of the aperture 58A-E and the detent surfaces 60A-E. Locking aperture 58A is compatible with the detent members 56 in the illustrated embodiment. The particular configuration for the detents 56 and the corresponding peripheral apertures 60 in the openings 58A-E can be chosen to provide a selected number of fixed positions for the adjustable fence member 20. The illustrated detents 56 and the apertures 60A are positioned 60 degrees apart. If the lower support structure is to be retrofitted to an existing fence the apertures 58A-E can be provided on a separate member that can be fastened to the fence rail.

The lower support structure 50 shown in FIGS. 13-15 is usable with any of the above-described embodiments of the upper support structure 22 to provide the fence 10 with support means which permits each fence member 20 to be adjustably positioned and releasably retained in a selected position with respect to the fence rails 16 and 18. If the infinitely variable support structure shown in FIG. 37 is used the lower support structure would be simplified as shown in FIG. 38.

If the upper support structure 22 shown in FIGS. 3 and 4 is used, the locking member 27 is rotated downwardly away from the upper fence rail 16. This will permit the fence member 20 to be raised and rotated with respect to the rail 16 and the lower rail 18 to the selected orientation. The member 20 rotates on the pin 52 until the member 20 is in the desired position, and the corresponding detent 56 is in place within the locking aperture 58A-E on the bottom rail 18. The locking member 27 then can be advanced on the thread 26B against the top rail 16 to limit the upward movement of the member 20 and lock the fence member 20 in the selected location.

If the embodiment for the upper support structure comprises the spring plunger 34 shown in FIGS. 5 through 9, or the collapsible tensioning insert 42 shown in FIGS. 10 through 12, the adjustment of the associated fence member 20 is accomplished by gripping the tab 30 on the fence member 20 and applying a moving force. This force will act against the bias of the spring loaded plunger 34 shown in FIG. 8, or against the collapsible tensioning member 42 shown in FIGS. 10-12 to permit the fence member 20 to be rotated into a selected position. Once the member 20 is in the desired position, release of the tab 30 will permit the bias of the plunger 34 or the collapsible tensioning member 42 to apply a biasing force to the fence member 20.

The lower support structure 50 on each fence member 20 operates in essentially the same manner as described above for each embodiment of the upward support structure. In each embodiment, the force of gravity and the weight of the fence member 20, assisted in some embodiments by a downward biasing force, will cause the detents 56 to be captured by the corresponding compatibly configured recesses 60A-E in the indexing and locking aperture 58A-E. The engagement between the detents 56 and the corresponding apertures 60A-E will releasably lock the associated member 20 in place. If the fence member 20 is to be adjusted further, the upward lifting force on the member 20 will disengage the detents 56 from the associated recesses 60A-E of the apertures 58A-E in the lower rail 18. The fence member 20 can then be rotated into a desired position and released. Gravity, assisted by a biasing force, will re-engage the detents 56 with the appropriate recesses 60A-E in the lower rail 18 to once again releasably lock the fence member 20 in a desired location.

The fence members 20 including the support structures described above therefore can be adjusted to change the function, use or appearance of the fence 10. If maximum security or privacy and minimum visibility through the fence are required, each of the fence members 20 can be positioned to be essentially parallel with the upper and lower fence rails 16 and 18. In the embodiment shown in FIGS. 10-12, the upper support structure including the collapsible tensioning member 42 will close the space between the upper portion of the member 20 and the upper rail 16 to further reduce the visibility through by the fence 10. Alternatively, each fence member 20 can be individually or collectively adjusted into any selected position with respect to the fence rails. For example, if a position of 60 degrees for the fence members 20 would be desired to respond to the effect of the sunlight or wind, provide privacy or perform other uses, one or all of the individual fence members 20 can be adjusted to that selected angle as described above and locked into place.

Figure 16:
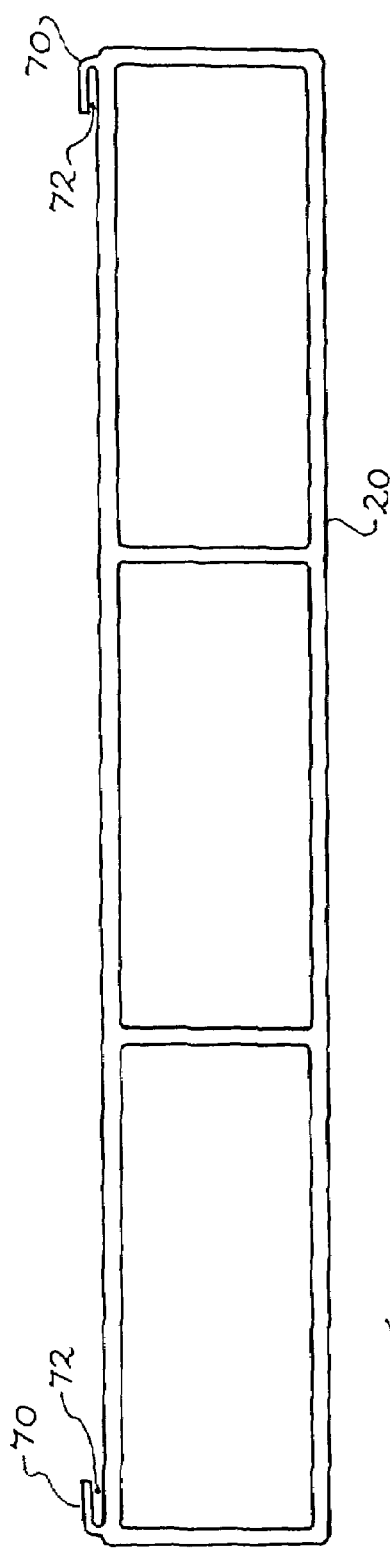
FIG. 16 is a cross-sectional view of a further embodiment of the present invention showing a system for adjusting the color or appearance of a fence or outdoor structure or for providing the structure with additional functions.
Figure 17:
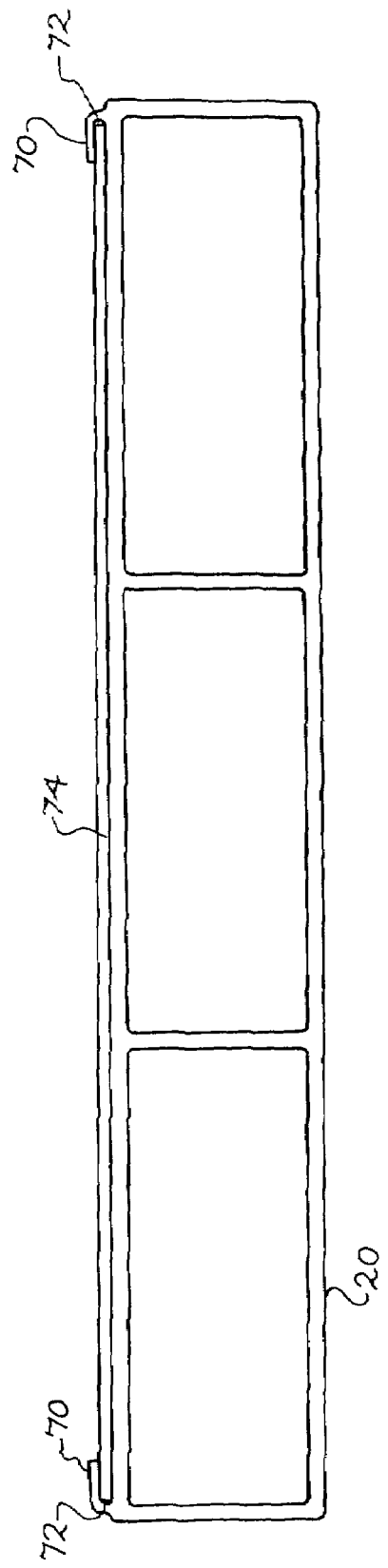
FIG. 17 is a cross-sectional view of the embodiment shown in FIG. 16 shown with a changeable insert in place in the system.

FIGS. 16-18 illustrate another aspect of the present invention which allows the components of the fence 10 such as the posts, rails or pickets or fence members to be varied in appearance or changed in function in a different manner. In this embodiment, each fence member 20 is provided on one or more of its faces with adhering or gripping elements. In the illustrated embodiment the gripping elements comprise a pair of channels 70, as clearly shown in FIGS. 16 and 17. These channels 70 are preferably formed in place when the member 20 is manufactured from a plastic material such as PVC. In FIGS. 16 and 17, each channel 70 is positioned along the edge of a face of the member 20 and forms a groove 72 along each edge. The gripping elements may also comprise grooves formed within the sides of the fence members 20. As shown in FIG. 17, a separate member such as a panel member 74 can be inserted into the grooves 72. The panel 74 will be removably held in place along each side of the fence member 20 by the channels 70. A suitable detent can be provided to prevent the panel 74 from sliding out of the channels 70.

The panel 74 is selected to have a color, texture or shape different from the color or texture of the associated fence member 20. If the fence member 20 is formed from a plastic material such as PVC, the usual color for the fence member is a light or white color. The changeable panel member 74 can be made from a material such as vinyl sheeting, and selected to change the color or texture of the member 20. The panel 74 also provides additional protection for the fence member 20 such as protection from ultraviolet rays.

Vinyl sheeting, such as used in vinyl siding for homes, is very useful for forming the separate panel members 74. Vinyl sheeting is readily available in a variety of colors and textures, and can be economically formed or sized to be positioned on outdoor structures of different dimensions. The use of vinyl sheeting to change the appearance or texture of an outdoor structure in accordance with this invention results in substantial economic and manufacturing benefits. The need to manufacture and inventory a substantial number of structures or components of varying colors and textures is reduced. Instead, the basic components of a structure such as a fence can be modified by providing a supply of readily available and economically manufactured vinyl sheets of different colors or textures.

FIG. 18 shows a fence system similar to the system shown in FIG. 1 but modified to include inserts 75A-75F on the faces of the fence members 20. For illustrative purposes, each insert 75A-75F is shown in FIG. 18 as having a different color, e.g., green, yellow, blue, orange, brown and silver, respectively.

The fence panels could also comprise solar panels 90, as shown in FIG. 21, or panels having a selected texture. As noted above, these changeable panels can be selected for a variety of purposes, such as to change a portion of a fence to match the color of a nearby house, to reflect holidays or changes in seasons for providing the fence with decorative patterns, to display messages, to collect solar energy, or for other uses.

FIGS. 19 through 21 illustrate further embodiments of the system for changing the appearance or function of the fence 10 in accordance with this invention. In FIG. 19, a generally unshaped channel member 80 is designed to be retrofitted onto an existing fence member 20. The channel member 80 can be adhered to the face of the member 20 by a suitable adhesive, or held in place by other forms of fasteners. The channel member 80 defines a channel 82 at each edge of the member 20 which creates grooves 84.

FIG. 20 illustrates the fence member 20 in FIG. 19 having a channel member 80 joined to its face and further having an insert member 89 positioned in place in the grooves 84. This channel member 80 and/or the insert member 89 can have a different color, texture or shape as compared to the appearance and material forming the fence member 20. Each fence member 20 including the channel member 80 can be changed by selecting the inserts 89 to suit the particular use or appearance desired for the fence member. Other inserts such as the panels 74 or the solar panel 90 shown in FIG. 21 can be inserted within the channel member 80.

FIG. 21 illustrates a further aspect of the present invention where the structure inserted onto the face of the fence member 20 comprises a solar energizing element or laminate such as a solar panel 90. In this embodiment each of the fence members 20 that carry a solar panel 90 will be capable of collecting solar energy from the sunlight. The above-described upper and lower adjustable supports for each fence member 20 can be used to position the fence members 20 to maximize the effectiveness of the solar panels 90 in response to the changes in seasons, or to accommodate other changes in environmental conditions. Suitable conducting wires or fittings and connectors can be included in the structure to distribute the energy collected by the solar panels 90. For example, electrical wires 91 can be connected to the solar panel 90 and extended through suitable holes in the fence member 20. The wires 91 can be connected to other wires, fittings or connectors in the fence system The embodiments of the invention shown in FIGS. 16-21 can be used to change the appearance of the fence member 20 for a variety of purposes. As an example, the structure can be used to change a normally white fence to a darker color that matches or complements the color of the associated house or other structure. The fence member 20 can be changed in appearance to reflect the seasons or holidays or other events important to the user. Alternatively the panels 74 can added to the fence member 20 to carry a message such as an advertisement. Other functions, such as the collection of solar energy by the solar panels 90, can be added to the fence.

The embodiments of the invention illustrated in FIGS. 16 through 21 can also be used in other outdoor structures such as railings or deck members or the like to change the appearance, color, texture or function of the structure. The insert panels 80 and 90 can be used to produce the desired change to the rail or the deck member.

FIG. 22A illustrates an improved fence rail 100 which can be incorporated into a fence. This fence rail 100 can be used as a replacement for the top fence rail 16 or the bottom fence rail 18. The fence rail 100 can be made from plastic such as PVC. The rail 100 is manufactured, such as by molding or extrusion, to have multiple compartments such as a lower compartment 102 and an upper compartment 104. Both of these compartments 102 and 104 preferably extend for the length of the rail 100. In an alternative embodiment the compartment 104 can include a vertical divider 105, as shown in dotted lines in FIG. 22A. This divider 105 forms a plurality of compartments and adds strength to the rail. One side of the lower compartment 102 in this embodiment is provided with an access opening 106. This access opening 106 is also formed into the rail 100 and also preferably extends for the length of the rail. The access opening 106 provides the fence rail 100 with an opening for receiving attachment devices such as the hanger 108 or the like, as shown in FIG. 22A. The hanger 108 or other suitable fastening device can be inserted within the access opening 106 and used to support a variety of items on the fence rail 100. The hanger 108 or other suitable devices can be received within the opening 106 for supplying decorative items, outdoor gardening or cooking implements, support surfaces for flower pots, garden hose supports, and the like.

The access opening 106 in the rail 100 further provides access to the lower compartment 102. The compartment 102 therefore can receive through the opening 106 additional items such as electrical wires or conduits that would desirably be contained within the compartment 102 along the length of the rail 100.

The upper portion of the rail 100 as illustrated FIG. 22A includes an openable top 110. This top 110 can be joined to the rail 100 so that a flexible hinge joint 112 one end of the top 110 to the rail 100. The top 110 can be moved about the hinge 112, as shown by the arrow in FIG. 22A to open and close the compartment 104. The outer end of the top 110 includes a first latch element 114 which is dimensioned to engage and be retained by a compatible second latch element 116 provided on the adjacent top portion of the rail 110. The latch elements 114 and 116 can be releasably engaged by moving the top 110 downwardly to bring the latch elements 114 and 116 into engagement. In this manner, the compartment 104 of the rail 100 can be selectively opened and closed and is readily accessible for use.

By this arrangement, items such as water hoses, air lines or electrical wires can be placed within the upper compartment 104 through the opening created by the opened top 110. After the object is in place, the top 110 can be closed by engaging the locking elements 114 and 116. The upper compartment 104 can be used to store items and create pathways for larger items such as electrical wires or hoses which would not readily fit within the access opening 106 of the lower portion 102. Moreover, the compartments 102 and 104 in the rail 100 can be used to separate items such as electric wires and water lines as desired. The conduits or wires provided within the compartments 102 or 104 of the rail 100 can be connected to similar components in other parts of the fence such as the fence members 20 through the apertures described above.

FIG. 22b shows a modified fence rail 100B which includes lower and upper compartments 102B and 104B and an access opening 106B. The upper compartment 104B in this embodiment of the rail 100 is closed. The lower compartment 102B is accessible through the opening 106B, as shown in FIG. 22B. The closed upper compartment 104 provides the rail 100 with increased rigidity and stiffness. At the same time, the access opening 106B permits the rail 100 to receive appliance hangers such as the hanger 108 shown in 22A, or other items. As discussed with respect to the embodiment in FIG. 22A, the opening 106B can also receive items such as wires or other conduits within the compartment 102B.

Figure 23:
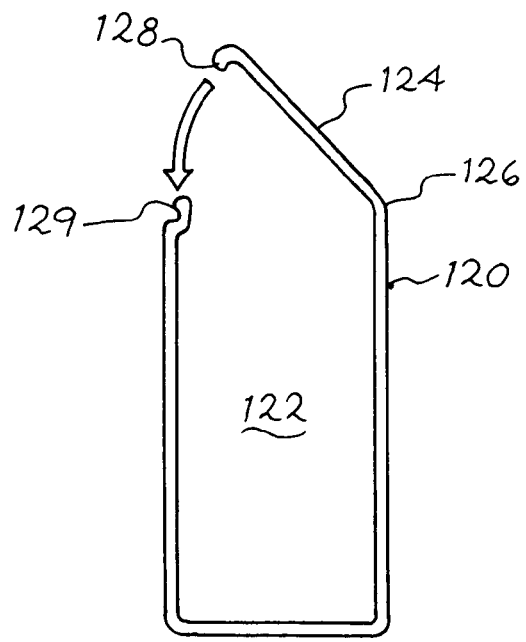
FIG. 23 is a cross-sectional view of a third embodiment for a fence rail having a single enlarged compartment.

FIG. 23 illustrates a third embodiment for a rail. In this embodiment the rail 120 is provided with a single enlarged compartment 122. A movable top 124 is attached to the rail 120 by a flexible hinge 126. As described above with respect to the embodiment of FIG. 22A, the upper portion of the top member 124 includes a latch element 128 which is adapted to engage with a mating latch element 129 on the rail 120. The rail 120 can be opened and closed by engaging or disengaging the latch elements 128 and 129. The compartment 122 is readily accessible to receive larger items such as larger water hoses, electrical wires, or the like. The compartment 122 in this embodiment also can be sufficiently large to act as a storage compartment.

Figure 24:
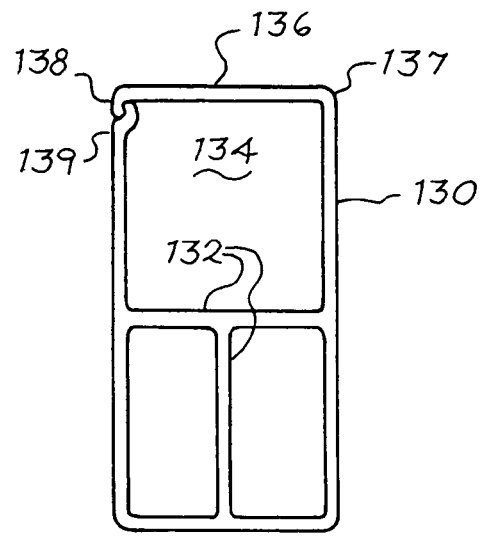
FIG. 24 is a cross-sectional view of a fourth embodiment of a fence rail with an openable compartment and multiple additional compartments.

FIG. 24 illustrates a still further embodiment of an improved rail 130. The fence rail 130 has reinforcing ribs 132 in the rail to provide rigidity or stiffness. The upper portion of the rail 130 defines a compartment 134 for receiving items such as hoses, electrical wires or air lines, or for storage purposes. As described with respect to the embodiment shown in FIGS. 22A and 23, the upper portion of the rail 130 includes a top 136 which is connected by a flexible hinge 137 to the body of the rail 130. Latch elements 138 and 139 are provided to releasably secure the top 136.

Figure 25:
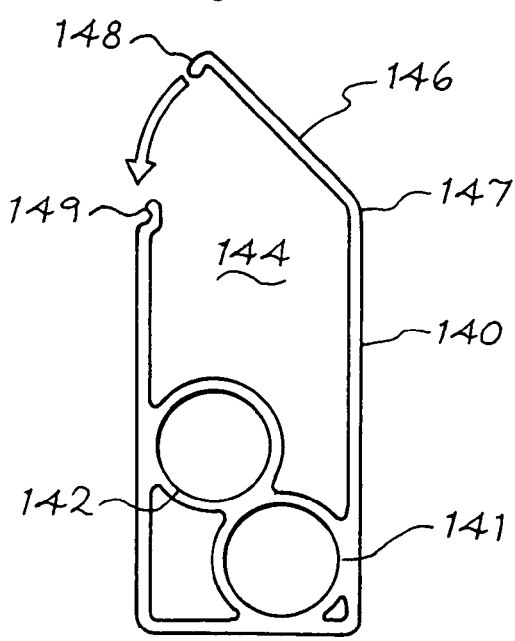
FIG. 25 is a cross-sectional view of fifth embodiment of an improved fence rail including an openable compartment and pre-formed conduits.

FIG. 25 illustrates a rail embodiment 140 which includes conduits 141 and 142 integrally formed within the rail. The conduits 141 and 142 are positioned in the lower portion of the rail and extend the full length of the rail. These conduits 141 and 142 can provide integrated passageways for fluids such as air or water, or for other items such as electrical wires. The upper portion of the rail 140 defines a compartment 144. A top 146 is connected by a flexible hinge 147 to the rail 140. The outer end of the top portion 146 includes latching element 148 which cooperates with a compatible latch element 149 on the rail 140. The compartment 144 is thus readily accessible by means of opening or closing the top portion 146.

Figure 26:
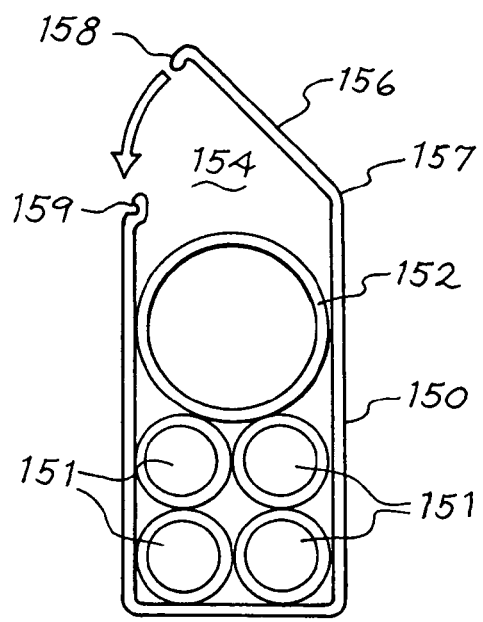
FIG. 26 is a cross-sectional view of a sixth embodiment of the improved fence rail including an openable compartment and additional conduits.

FIG. 26 shows another embodiment of a fence rail 150 with passages laid in place within the rail. The plurality of smaller passageways 151 are adapted to form conduits or to receive smaller items such as electrical wires. A larger integral passageway 152 forms a larger conduit or can receive larger wires or the like. Access to the upper portion of the rail 150 is permitted by the movable top portion 156 which provides access to the upper compartment 154 by means of a flexible integral hinge 157. Latching elements 158 and 159 on the adjacent ends of the rail 150 and the top 156 permit easy access to the top compartment 154.

FIG. 27 illustrates a fence system incorporating the above-described adjustable fence members, such as described above with respect to FIGS. 1-3, in combination with an improved fence rail 100 as shown in FIG. 22A. The fence rail 100 is supported between fence posts 12 and 14 and, in turn, provides upper support for each of the adjustable fence members 20. The access opening 106 in the fence rail 100 permits attachments such as the hanger 108 to be added to the fence. The access 106 also would permit items such as electrical wires to be placed within the lower compartment 102 of the rail 100, as shown in FIG. 22A. Similarly, the openable top portion 110 of the fence rail 100 provides ready access to the upper compartment 104. The compartment 104 could also be provided in another lower rail of the fence. In this manner, items can be stored in a rail of the fence, or the rail compartment 104 can be used to place items such as electrical wires, water or air lines along the length of the rail 100.

In FIG. 28, the top fence rail 100, having a construction such as shown in FIG. 23, has a top 124 which permits a compartment 122 which could be selectively opened and closed. This compartment 122 in this embodiment contains a series of insertable containers 112 adapted to support items such as floral arrangements, or bird seeders, or the like. A plurality of these containers can be stationed along rail 100 in the compartment 122 to provide the fence structure with containerized materials such as floral arrangements, bird feeders. Insect repellants, net systems or the like, FIGS. 29-31 illustrated further the embodiment of the invention where an existing fence structure is retrofitted to have a rail including an accessible compartment. In this embodiment a fence system including fence members 20 supported on upper and lower rails 16 and 18 by fence post 12 and 14 is provided with a retrofit elongate rail 120. As shown in FIGS. 29-31 rail 120 is extended laterally along the fence system and supported by the fence posts 12 and 14. Alternatively, the rail 120 can be supported by the preexisting fence rail 16. This fence rail 120 is similar to the rail having an accessible compartment such as shown in FIGS. 22A-26. The rail includes a movable cover 122 which can be opened and closed to provide ready access to the compartment 124 within the rail. As described above, the compartment provided in the rail 120 can receive a variety of objects such as wires, fluid lines, floral containers and the like.

The embodiment of the fence system shown in FIGS. 32 and 33 provide the fence with a device to raise or extend the fence to suit particular needs or functions. For example, the extension mechanism 130 can be used if the area near the fence is being used for a game to keep balls or other items within the fenced area. Additional screening can also be used in place of the net 132 to enhance the privacy of the fence.

FIGS. 34 and 35 show a universal attachment mechanism that can be incorporated into the fence system of this invention. In this embodiment, the compartment 104 within the fence rail 100 (with top 110 being removable if desired) is used to receive and support an attachment mechanism 140. The mechanism 140 can be dimensioned to fit securely within the compartment 104 and can extended for a selected length along the rail 100. Grooves or retaining surfaces 142 can be provided to engage with the upper portions of the rail 100 and assist in securing the mechanism 140 in the rail. The upper portion of the mechanism 140 can be dimensioned to extend out of the compartment 104 in the rail 100, as seen in FIGS. 34 and 35 to support attachments.

Fastening grooves or recesses 144, 146 and 148 are provided in the top portion of the mechanism 140. These recesses 144, 146 and 148 can be different sizes or shapes and are designed to receive corresponding fastening elements on items which can be connected to and supported by the fence rail 100. For example, a working surface or table 150 can be joined in the recess 146 and a support hook 152 can be connected in the recess 148. Other items with compatible fastening elements can be added to the fence rail 100 by use of this universal attachment mechanism 140.

Figure 36A:
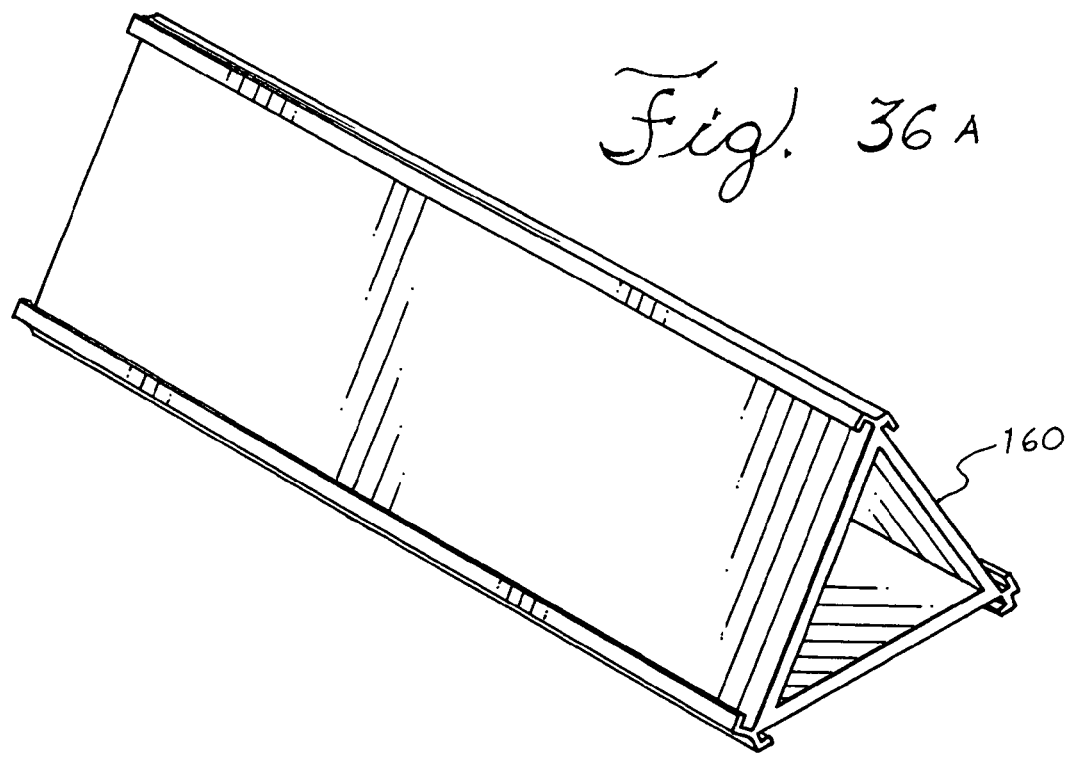
FIG. 36A is a perspective view of a modified fence rail
Figure 36B:
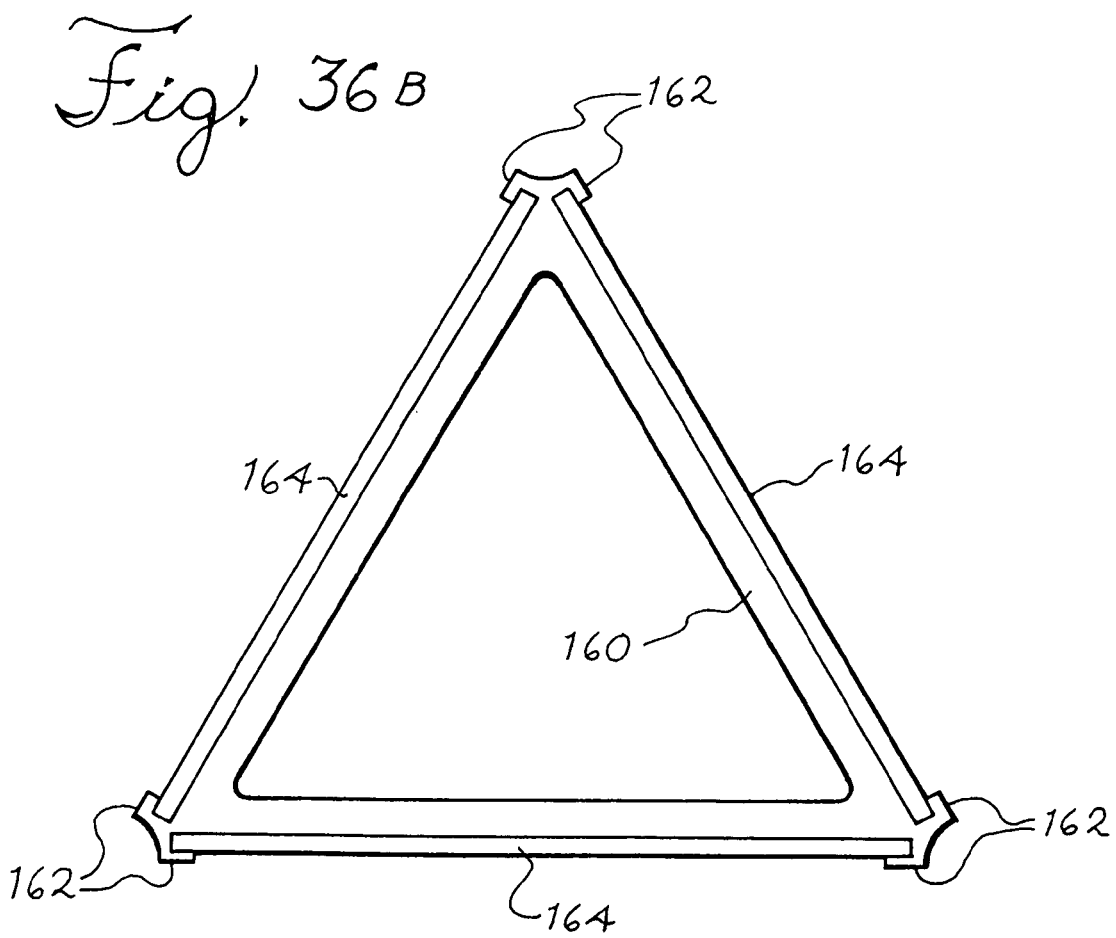
FIG. 36B is a cross-sectional view of the modified rail shown in FIG. 36A.

FIG. 36 illustrates a modified rail that also can be used when it is desired to perform functions such as collect solar energy, display signs or the like on the rail or change the color or texture of the rail. FIG. 36A shows a perspective view of a triangular rail 160 which includes two angled upper surfaces. Gripping elements 162 are positioned on each corner of the rail 160 for receiving panels 164. These panels 164 can be made to have a selected color or texture, or can carry a message such as an advertisement. In addition panels 164 can comprise solar panel or laminate to collect solar energy. The angled upper surfaces of this triangular rail 160 makes the panels very visible and positions a solar panel 164 for more exposure to the sun.

FIGS. 37, 37A and 38 illustrate a modified support structure for use in an adjustable fence in accordance with this invention. As seen in FIG. 37 one end of a fence member 20 is provided with an infinitely variable support structure 170 including a pivot pin 172. One end of the pin 172 is fixed in the fence member 20 by a head 174. The other end extends into a positioning clamp assembly 176. The clamp assembly 176 pivotally receives the pin 172 and is fixed within the adjacent fence rail 16. A flexible clamping ring 178 on the clamping assembly surrounds the pin 172 and includes a fastener such as the threaded bolt 180. This ring 178 is connected to or integral with the assembly 176. FIG. 38 shows a suitable pivot pin 182 that is positioned in the other end of the fence member 20 and allows the member to rotate with respect to the associated rail.

The arrangement for the variable support structure 170 shown in FIGS. 37, 37A and 38 can be used to move the fence member 20 into a plurality of selected positions with respect to the rail 16 by pivoting the member about the pins 172 and 182. Once the member 20 is in the desired position the bolt 180 can be advanced to tighten the clamp 178 around the pin 172. Since the clamp 178 is fixed to the rail 16 through the clamp assembly 176, this clamping force will releasably secure the fence member in the selected position. An infinite number of positions are possible for the member 20 as a result of this embodiment for the support structure.

As described above, the support structures for the fence members 20 include apertures that can be used in combination with the compartments 102 or 104 in the top rail 100 to connect the fence members 20 with electrical wiring, or with conduits for receiving water or the like. The fence members 20 can further include inserts, such as the panels 74 or the solar panels 90 which can be connected to wiring in the rail 100. The functions of the fence 10 are substantially enhanced by the combined use of the features of this invention The features and functions of the improved rails illustrated in FIGS. 22 through 26 can be adapted for use with other structures, such as hand rails or decking. Such structures would thereby be provided with accessible compartments and passageways for receiving items, such as wires or conduits, which enhance the function of the structure.

It is therefore intended that the foregoing detailed description be regarded as illustrative rather than limiting, and that it be understood that it is the following claims, including all equivalents, that are intended to define the spirit and scope of this invention.

We claim:

1. A fence system comprising;
   a first post engaging a first portion of an outdoor ground surface that is totally exposed to an outdoor environment;
   a second post engaging a second portion of said outdoor ground surface;
   a fence rail for supporting a portion of the fence system, wherein said fence rail is attached to said first post and said second post:
   a first fence member supported by said fence rail and having a first face of a selected appearance;
   a first gripping element included on said first fence member, wherein said first gripping element is a groove;
   a first fence panel adapted to be removably retained on said first fence member by inserting said first fence panel within said groove and further adapted to modify said first face of said first fence member;
   a second fence member supported by said fence rail and having a second face of a selected appearance;
   a second gripping element included on said second fence member; and
   a second fence panel adapted to be removably retained on said second fence member by said second gripping element and further adapted to modify said second face of said second fence member, wherein said first fence member and said second fence member are not coupled to one another to move in unison and wherein said first face and said second face are totally exposed to said outdoor environment.

2. A fence system in accordance with claim 1 wherein said first fence panel is a different color than the first face of said first fence member so that engagement of said first panel with said first gripping element changes a color of said first face.

3. A fence system in accordance with claim 2 wherein said first fence panel is provided with a darker color than said first face of said first fence member.

4. A fence system in accordance with claim 1 wherein said first face of said first fence member has a selected texture and said first fence panel is a different texture so that engagement of said first panel with said first gripping element chances the texture of said first face.

5. A fence system in accordance with claim 1 wherein said groove is provided adjacent to lateral edges of said first fence member and adapted to receive and grip said first fence panel.

6. A fence system in accordance with claim 5 wherein said groove extends along substantially a length of said first fence member.

7. A fence system in accordance with claim 1, wherein said first panel comprises a solar panel for generating electricity.

8. A fence system comprising;
   a fence rail for supporting a portion of the fence system:
   a fence member supported by said fence rail and having a face of a selected appearance;
   a gripping element included on said fence member; and
   a fence panel adapted to be removably retained on said fence member by said gripping element and further adapted to modify said face of said fence member, wherein said fence panel comprises a solar panel for generating electricity.

9. A fence system comprising;
   a first post engaging a first portion of an outdoor ground surface that is totally exposed to an outdoor environment;
   a second post engaging a second portion of said outdoor ground surface;
   a fence rail for supporting a portion of the fence system, wherein said fence rail is attached to said first post and said second post:
   a first fence member supported by said fence rail and having a first face of a selected appearance, wherein said first fence member is formed of an extruded plastic material;
   a first gripping element included on said first fence member, wherein said first gripping element comprises a groove provided adjacent lateral edges of said first fence member and adapted to receive and grip a first fence panel, wherein said groove extends along a length of said first fence member, wherein said first fence panel is adapted to be removably retained on said first fence member by said first gripping element and further adapted to modify said first face of said first fence member;
   a second fence member supported by said fence rail and having a second face of a selected appearance;
   a second gripping element included on said second fence member, wherein said second gripping element is adapted to receive and grip a second fence panel, wherein said second fence panel is adapted to be removably retained on said second fence member by said second gripping element and further adapted to modify said second face of said second fence member wherein said first fence member and said second fence member are not coupled to one another to move in unison and wherein said first face and said second face are totally exposed to said outdoor environment.

10. A method of changing the appearance of a fence system comprising;
   providing a first post engaging a first portion of an outdoor ground surface that is totally exposed to an outdoor environment;
   providing a second post engaging a second portion of said outdoor ground surface;
   providing a first fence member having a first face of a selected appearance and a first in element that is a groove, wherein said first fence member is attached indirectly to said first post and said second post;
   providing a first fence panel having a different appearance than said first fence member;
   engaging said first fence panel with said first gripping element by inserting said first panel within said groove to attach said first panel to said first fence member and thereby modify the appearance of said first fence member;
   providing a second fence member having a second face of a selected appearance and a second gripping element;
   providing a second fence panel having a different appearance than said second fence member;
   engaging said second fence panel with said second gripping element so as to attach said second fence panel to said second fence member and thereby modify the appearance of said second fence member; and
   rotating said first fence panel, wherein said rotating does not cause said second fence panel to move and wherein said first fence panel is totally exposed to said outdoor environment during said rotating.

11. The method in accordance with claim 10, wherein said first fence member, said second fence member, said first fence panel and said second fence panel are made of a plastic material and wherein said engaging said first fence panel and said engaging said second fence panel are performed outdoors.

12. A method of providing a fence system capable of changes in appearance comprising:
   providing a first post engaging a first portion of an outdoor ground surface that is totally exposed to an outdoor environment;
   providing a second post engaging a second portion of said outdoor ground surface;
   forming a plurality of fence members from extrudable plastic material with each of said plurality of fence members having a face of a selected appearance and gripping elements on lateral edges thereof, wherein each of said plurality of fence members is attached indirectly to said first post and said second post;
   forming a plurality of fence panels from extrudable plastic material to have an appearance different from the selected appearance of said faces of said plurality of fence members;
   engaging each of said plurality of fence panels with said gripping elements on each of said plurality of fence members and thereby modify an appearance of each of said plurality of fence members; and
   moving one of said plurality of fence members without causing movement of any others of said plurality of fence members, wherein said one of said plurality of fence members is totally exposed to said outdoor environment during said moving.

13. The method in accordance with claim 12, wherein said engaging each of said plurality of panels with said gripping elements is performed outdoors.

14. A fence system comprising:
   a plurality of fence components including a first post, a second post, a rail, a first fence member and a second fence member each having a face of a selected appearance, wherein said first fence member and said second fence member each move independently of one another and wherein said first post engaging a first portion of an outdoor ground surface that is totally exposed to an outdoor environment, said second post engaging a second portion of said outdoor ground surface and said fence rail is attached to the said first post and said second post;
   a gripping element that is a groove included on one of said components adjacent said face of the component;
   a panel adapted to be removably retained in said groove to modify said face of said one component, wherein said panel is totally exposed to said outdoor environment.

15. A fence system in accordance with claim 14 wherein said one component comprises said post.

16. A fence system in accordance with claim 14 wherein said one component comprises said first fence member and said second fence member has a second gripping element that removably retains a second panel to modify said face of said second fence member.

17. A fence system in accordance with claim 14 wherein said one component comprises said rail.

18. A fence system in accordance with claim 17 wherein said rail is triangular in cross section with three faces and said gripping element is adjacent each face.

* * * * *

UNITED STATES PATENT AND TRADEMARK OFFICE
CERTIFICATE OF CORRECTION

PATENT NO. : 7,389,975 B2 Page 1 of 1
APPLICATION NO. : 11/293454
DATED : June 24, 2008
INVENTOR(S) : Michael Rowley et al.

It is certified that error appears in the above-identified patent and that said Letters Patent is hereby corrected as shown below:

In the Claims

In column 13, claim 1, line 46, immediately after "system comprising" delete ";" and substitute --:-- in its place.

In column 13, claim 1, line 54, immediately after "said second post" delete ":" and substitute --;-- in its place.

In column 14, claim 8, line 29, immediately after "system comprising" delete ";" and substitute --:-- in its place.

In column 14, claim 8, line 30, immediately after "of the fence system" delete ":" and substitute --;-- in its place.

In column 14, claim 9, line 39, immediately after "system comprising" delete ";" and substitute --:-- in its place.

In column 14, claim 9, line 47, immediately after "said second post" delete ":" and substitute --;-- in its place.

In column 15, claim 10, line 9, immediately after "comprising" delete ";" and substitute --:-- in its place.

Signed and Sealed this

Twelfth Day of May, 2009

JOHN DOLL
*Acting Director of the United States Patent and Trademark Office*